(12) United States Patent
Rosenberg et al.

(10) Patent No.: US 11,893,192 B2
(45) Date of Patent: Feb. 6, 2024

(54) INTERPOLATION ELECTRODE PATTERNING FOR CAPACITIVE-GRID TOUCH SENSOR

(71) Applicant: Sensel, Inc., Sunnyvale, CA (US)

(72) Inventors: Ilya Rosenberg, Mountain View, CA (US); Shuangming Li, Santa Clara, CA (US); Darren Lochun, Mountain View, CA (US)

(73) Assignee: Sensel, Inc., Sunnyvale, CA (US)

( * ) Notice: Subject to any disclaimer, the term of this patent is extended or adjusted under 35 U.S.C. 154(b) by 132 days.

(21) Appl. No.: 17/525,301

(22) Filed: Nov. 12, 2021

(65) Prior Publication Data

US 2022/0404930 A1 Dec. 22, 2022

Related U.S. Application Data

(60) Provisional application No. 63/212,395, filed on Jun. 18, 2021.

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 3/0442* (2019.05)

(58) Field of Classification Search
CPC .... G06F 3/0446; G06F 3/0412; G06F 3/0442; G06F 3/04164; G06F 3/0445
See application file for complete search history.

(56) References Cited

U.S. PATENT DOCUMENTS

| 6,147,680 | A | * | 11/2000 | Tareev | G06F 3/047 345/173 |
|---|---|---|---|---|---|
| 9,652,093 | B2 | * | 5/2017 | Roberts | G06F 3/0416 |
| 10,228,808 | B2 | * | 3/2019 | Yilmaz | G06F 3/0446 |
| 2007/0074914 | A1 | * | 4/2007 | Geaghan | G06F 3/0445 178/18.06 |
| 2008/0246496 | A1 | * | 10/2008 | Hristov | G06F 3/0446 324/686 |
| 2010/0164889 | A1 | * | 7/2010 | Hristov | G06F 3/0446 345/173 |

(Continued)

OTHER PUBLICATIONS

International Search Report and Written Opinion received for PCT Application Serial No. PCT/US2022/016208 dated May 17, 2022, 15 pages.

*Primary Examiner* — Amy Onyekaba
(74) *Attorney, Agent, or Firm* — Amin, Turocy & Watson, LLP

(57) ABSTRACT

Interpolation electrode patterning for capacitive-grid touch sensor is provided herein. Provided is a device that includes multiple column electrodes that include a first column electrode divided into a plurality of first column sub-electrodes and at least a second column electrode divided into a plurality of second column sub-electrodes. The first column electrode and the second column electrode are adjacent column electrodes. Further, first column sub-electrodes of the plurality of first column sub-electrodes are interleaved with second column sub-electrodes of the plurality of second column sub-electrodes in a first direction. A first layer of the device comprises the multiple column electrodes and a second layer of the device comprises the multiple row electrodes.

26 Claims, 26 Drawing Sheets

(56) References Cited

U.S. PATENT DOCUMENTS

| | | |
|---|---|---|
| 2010/0302201 A1 | 12/2010 | Ritter et al. |
| 2011/0141053 A1* | 6/2011 | Bulea ............... G06F 3/0481 345/174 |
| 2011/0298737 A1* | 12/2011 | Maeda ............... G06F 3/0445 345/173 |
| 2012/0019449 A1* | 1/2012 | Yilmaz ............... G06F 3/0445 345/173 |
| 2012/0062472 A1* | 3/2012 | Yilmaz ............... G06F 3/0448 345/173 |
| 2013/0207923 A1* | 8/2013 | Mohindra ........... G06F 3/0443 345/174 |
| 2013/0285975 A1* | 10/2013 | Hong ................. G06F 3/0416 345/173 |
| 2014/0292703 A1* | 10/2014 | Yilmaz ............... G06F 3/0445 345/174 |
| 2014/0306922 A1* | 10/2014 | Yilmaz ............... G06F 3/0448 345/174 |
| 2014/0313169 A1* | 10/2014 | Kravets ............... H03K 17/962 324/660 |
| 2014/0320763 A1* | 10/2014 | Lee .................. G06F 3/0448 349/12 |
| 2014/0327845 A1* | 11/2014 | Yashiro ............... G06F 3/0445 349/12 |
| 2015/0002446 A1 | 1/2015 | Ayzenberg |
| 2015/0028894 A1* | 1/2015 | Sleeman ............. G06F 3/0446 324/662 |
| 2015/0077650 A1* | 3/2015 | Huang ................ G06F 3/0445 29/842 |
| 2015/0091859 A1 | 4/2015 | Rosenberg et al. |
| 2016/0085350 A1 | 3/2016 | Edwards et al. |
| 2016/0299614 A1 | 10/2016 | Yang et al. |
| 2018/0224964 A1* | 8/2018 | Church ............... G06F 3/047 |
| 2018/0224968 A1* | 8/2018 | Church ............... G06F 3/0448 |
| 2019/0339776 A1 | 11/2019 | Rosenberg et al. |
| 2021/0081076 A1* | 3/2021 | McCulloch ......... G06F 3/04166 |
| 2021/0349576 A1* | 11/2021 | Yilmaz ............... G06F 3/04144 |

* cited by examiner

INTERPOLATION ELECTRODE PATTERNING FOR CAPACITIVE-GRID TOUCH SENSOR

CROSS-REFERENCE TO RELATED APPLICATIONS

This application claims the benefit of priority to U.S. Provisional Application No. 63/212,395, filed Jun. 18, 2021, and entitled "INTERPOLATION ELECTRODE PATTERNING FOR CAPACITIVE-GRID TOUCH SENSOR," the entirety of which is expressly incorporated herein by reference.

BACKGROUND

Existing touch sensor technologies use interpolation resistors that are surface mounted to a Printed Circuit Board (PCB) for capacitive touch trackpad sensor. Such existing technologies require a number of interpolation resistors or other impedance elements between active lines. Therefore, one or more other elements are needed to create a fall-off in sensitivity. Such elements increase fabrication costs and suffer from non-linearity. Accordingly, unique challenges exist related to touch sensor technologies.

BRIEF DESCRIPTION OF THE DRAWINGS

The aforementioned objects and advantages of the present invention, as well as additional objects and advantages thereof, will be more fully understood herein after as a result of the detailed description when taken in conjunction with the following drawings in which.

DETAILED DESCRIPTION

Figure 1:
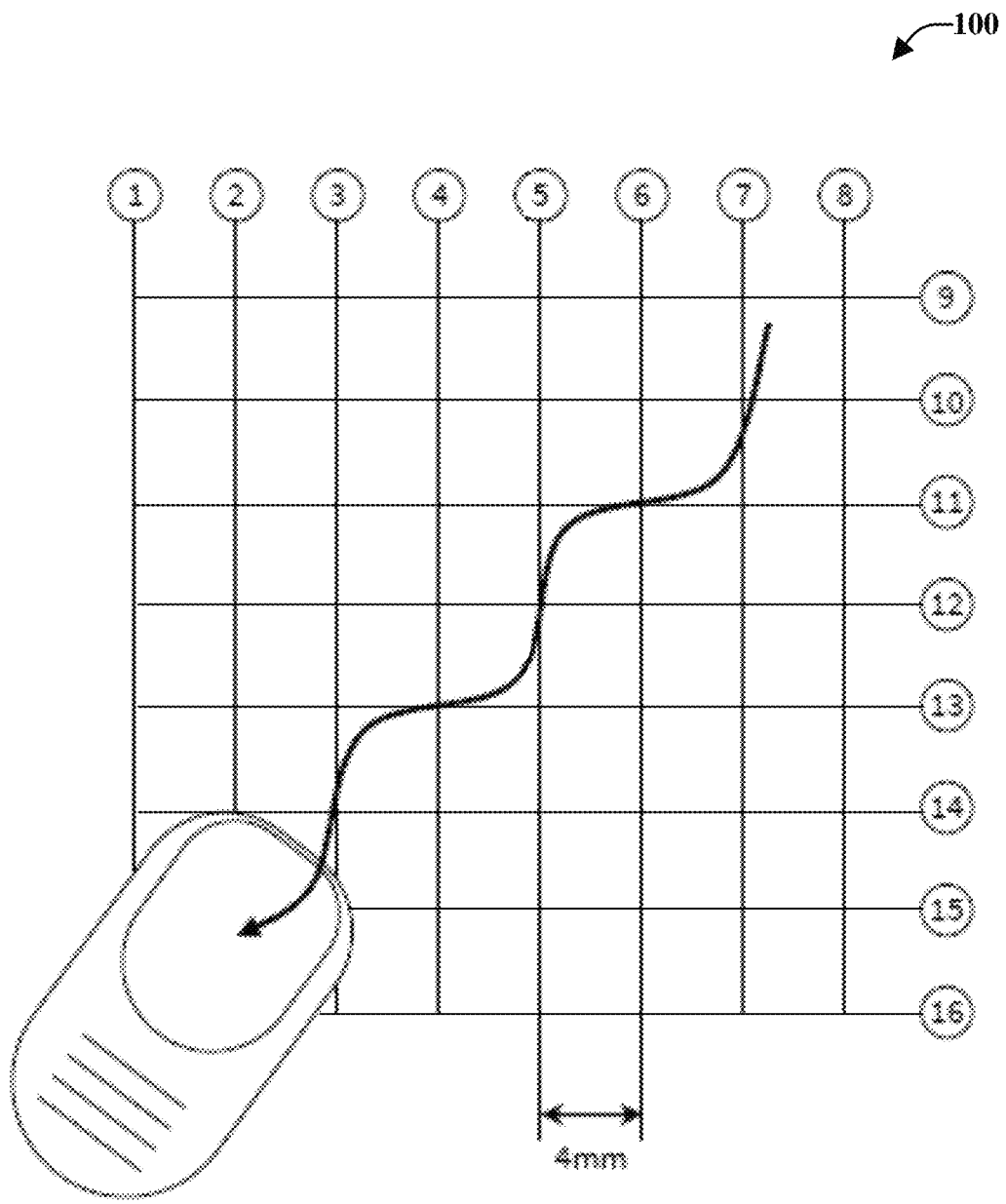
FIG. 1 illustrates an example, non-limiting, schematic representation of a top down view of touch tracking of a capacitive touch sensor.

The disclosed embodiments relate to interpolation electrode patterning for a capacitive-grid touch sensor. In an example, the disclosed embodiments facilitate interpolation purely through the structure of electrodes instead of through impedance elements. The disclosed embodiments can be fabricated as a Printed Circuit Board (PCB), for example, rigid and flexible. Further, the disclosed embodiments can be fabricated as a printed electronic structure. The disclosed embodiments can also be incorporated into a display technology, such as a Liquid Crystal Display (LCD) or an Organic Light Emitting Diode (OLED), that includes an inbuilt in-cell capacitive sensor and/or an inbuilt on-cell capacitive sensor.

Described herein is the patterning of a capacitive sensor whose drive lines and sense lines are interpolated and replace interpolation resistors and/or other impedance elements, referred to as interpolation capacitance. Further, describe herein are one or more options for achieving capacitive-grid sensor patterning. More specifically, options discussed herein include low-density interpolated (LI) versions and high-density interpolated (HI) versions.

As mentioned, the disclosed embodiments facilitate interpolation purely through the structure of electrodes instead of through impedance elements. For example, a fall-off in sensitivity (e.g., a bi-linear fall-off in sensitivity) is created through the structure of the electrodes.

Use cases of the disclosed embodiments include, but are not limited to, for example, touch pad accuracy and responsiveness, gaming applications, stylist interactions (e.g., drawing, stylist hover), and obtaining precision information (e.g., touch area, shape of the touch, statistics).

As mentioned, some existing technologies use interpolation resistors that are surface mounted to a PCB for capacitive touch trackpad sensor. For example, such existing technologies require a number of interpolation resistors (e.g., 4 resistors) between active lines. Although discussed with respect to resistors, other impedance elements (e.g., resistors, inductors, capacitors, and so on) are utilized by existing technology for interpolation. Accordingly, one or more other elements are needed to create a fall-off in sensitivity. For example, for a capacitive sensor, the line (e.g., column of electrodes and/or row of electrodes) is being pulsed multiple times and, therefore, power is leaking to ground at every pulse through the impedance elements.

The disclosed embodiments eliminate the use of impedance elements (e.g., resistors, capacitors, inductors, and so on). For example, the disclosed embodiments create a fall-off in sensitivity (e.g., a bi-linear fall-off) purely through the structure of the electrodes rather than creating the fall-off through impedance elements. As utilized herein, a bi-linear fall-off refers to creating a linear fall-off in a first direction (e.g., an x direction) and a second direction (e.g., a y direction). The linear fall-offs created in both the first direction and the second direction result in a bi-linear fall-off.

By way of example and not limitation, the existing sensors have a method for sensing touch where each electrode has a fractional sensitivity from one (1) to zero (0). In contrast, the disclosed embodiments have a method for sensing touch where each electrode has the same sensitivity, however, the respective densities and/or respective areas of the electrodes are changed across the pattern. For example, there can be more electrodes in some areas and less electrodes in other areas to achieve a similar effect without having the impedance elements (e.g., resistor(s), capacitor(s), inductor(s), and so on) between the adjacent traces. Further details will be provided below.

Without the use of impedance elements (e.g., resistors, capacitors, inductors, and so on) between the adjacent traces, the various embodiments provided herein can be fabricated using a simpler fabrication process as compared to existing sensor fabrication processes. Further, the architecture provided herein is more forgiving in terms of various parameters as compared to existing architectures. In addition, the architecture is less expensive as compared to architectures that utilize impedance elements. Thus, provided herein is an architecture that is sensitive to touch by having multiple drive lines and multiple sense lines, without the use of impedance elements, which facilitates differentiation of touch with finer accuracy with respect to where the touch is occurring.

FIG. 1 illustrates an example, non-limiting, schematic representation of a top down view of touch tracking of a capacitive touch sensor 100. The capacitive touch sensor 100 of FIG. 1 is illustrated as having eight columns (labeled 1 through 8) and eight rows (labeled 9 through 16). FIG. 1 depicts the non-linear tracking of an existing capacitive touch sensor configuration with a 4 millimeter (mm) active electrode pitch and a 4 mm sensing pattern pitch. Sensors of this resolution (e.g., 4 mm pitch resolution) can inherently have poor linearity and positional accuracy. More specifically, as a touch element (which is illustrated as a finger) moves in a straight line across a surface of the capacitive touch sensor 100 (e.g., diagonally from the top right toward the bottom left), the path that the sensor detects (or determines) that the finger has taken is wavy and non-linear, as illustrated by the thick curvy line. This is due to the inherent non-linearity of the sensor. While many sensor designs attempt to compensate for this non-linearity with lookup tables, it is impossible to compensate well for all sizes and shapes of touch.

Figure 2:
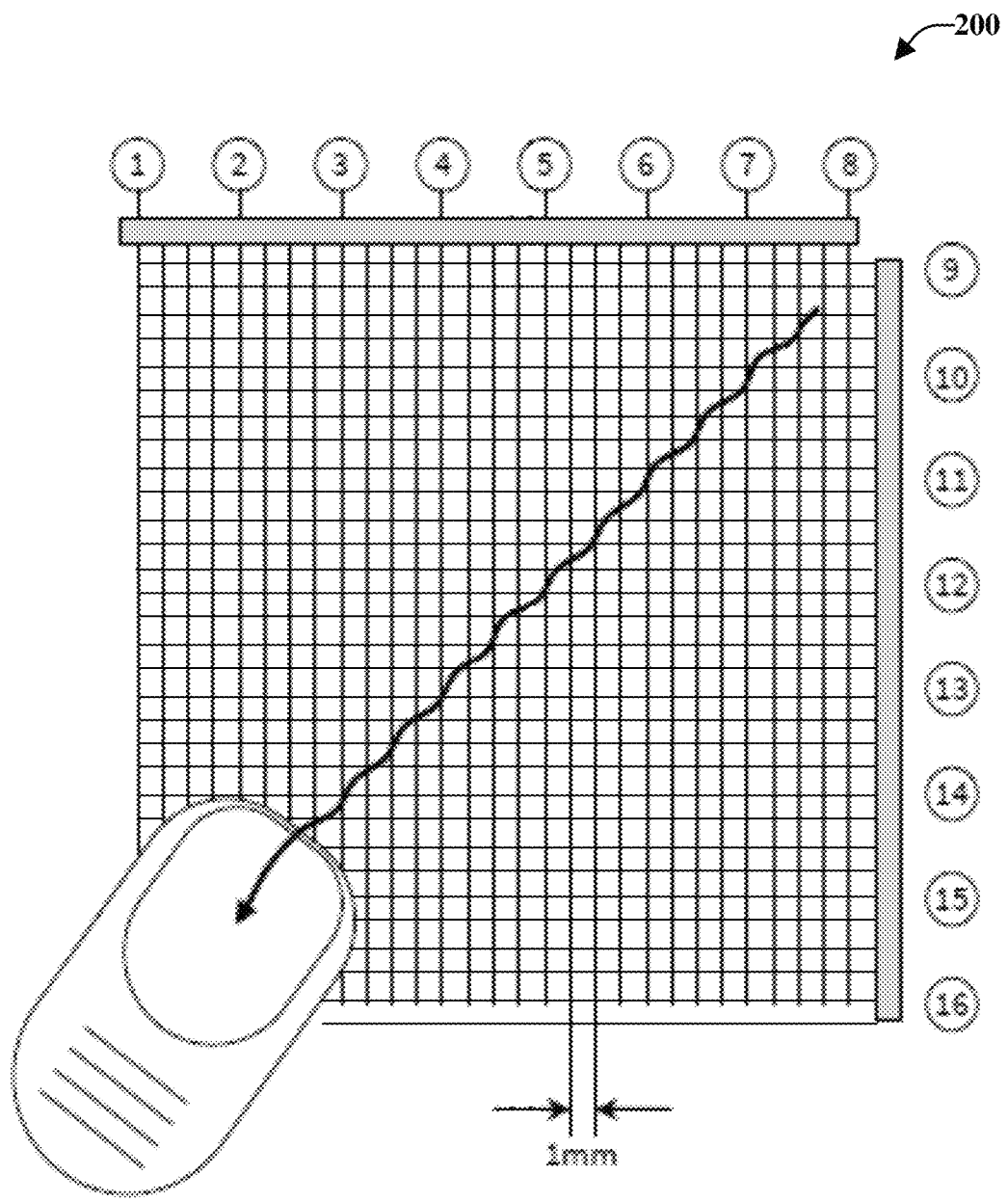
FIG. 2 illustrates an example, non-limiting, schematic representation of a top down view of touch tracking of a capacitive-grid sensor in accordance with one or more embodiments described herein.

FIG. 2 illustrates an example, non-limiting, schematic representation of a top down view of touch tracking of a capacitive-grid sensor 200 in accordance with one or more embodiments described herein. The capacitive-grid sensor 200 is illustrated as having eight active column electrodes (labeled 1 through 8), with one or more interpolating column electrodes between the active column electrodes. The capacitive-grid sensor 200 is also illustrated as having eight active row electrodes (labeled 9 through 16). Although not illustrated, the capacitive-grid sensor 200 can have one or more interpolating row electrodes between the active row electrodes. The capacitive-grid sensor 200 has a configuration with a 1 mm sensing pattern pitch. It is noted that although the active electrode pitch is 4 mm, the architecture of the capacitive-grid sensor 200 allows for a much tighter sensing pattern pitch of around 1 mm.

Depicted in FIG. 2 is the linear tracking of the capacitive-grid sensor 200 as discussed herein. As illustrated, as a touch element (e.g., the illustrated finger) moves in a straight line across a surface of a capacitive-grid sensor 200 (e.g., diagonally from the top right toward the bottom left), the path that the sensor detects (or determines) that the finger has taken is linear, as illustrated by the thick line. The many electric field lines (e.g., due to the 1 mm pitch) intersect with the touch element (e.g., the finger), causing many more capacitive interactions over the surface of the finger and, therefore, facilitate a much more linear response, and much fewer imperfections, as compared to the response of FIG. 1.

This more linear response is due to the higher pitch of sensor elements in the capacitive-grid sensor 200. This increased linearity facilitates benefits with respect to all interactions with the capacitive-grid sensor 200, whether the touch is from a finger, a stylus, or any other conductive object. Furthermore, any imperfections in the touch position (e.g., finger position) are very small in scale, and, in some implementations, can easily be filtered using a time-domain filtering algorithm applied to the calculated finger positions to obtain a perfectly linear line at the output, if needed.

As will be discussed in further detail below, provided is a high resolution sensor that can be fabricated while maintaining the same number of drive electrode rows and electrode columns (e.g., columns 1 through 8 and rows 9 through 16 of FIG. 2). Accordingly, the various embodiments relate to a high-resolution touch sensor architecture (e.g., capacitive-grid) that can be fabricated without sacrificing cost, power, or latency.

Figure 3:
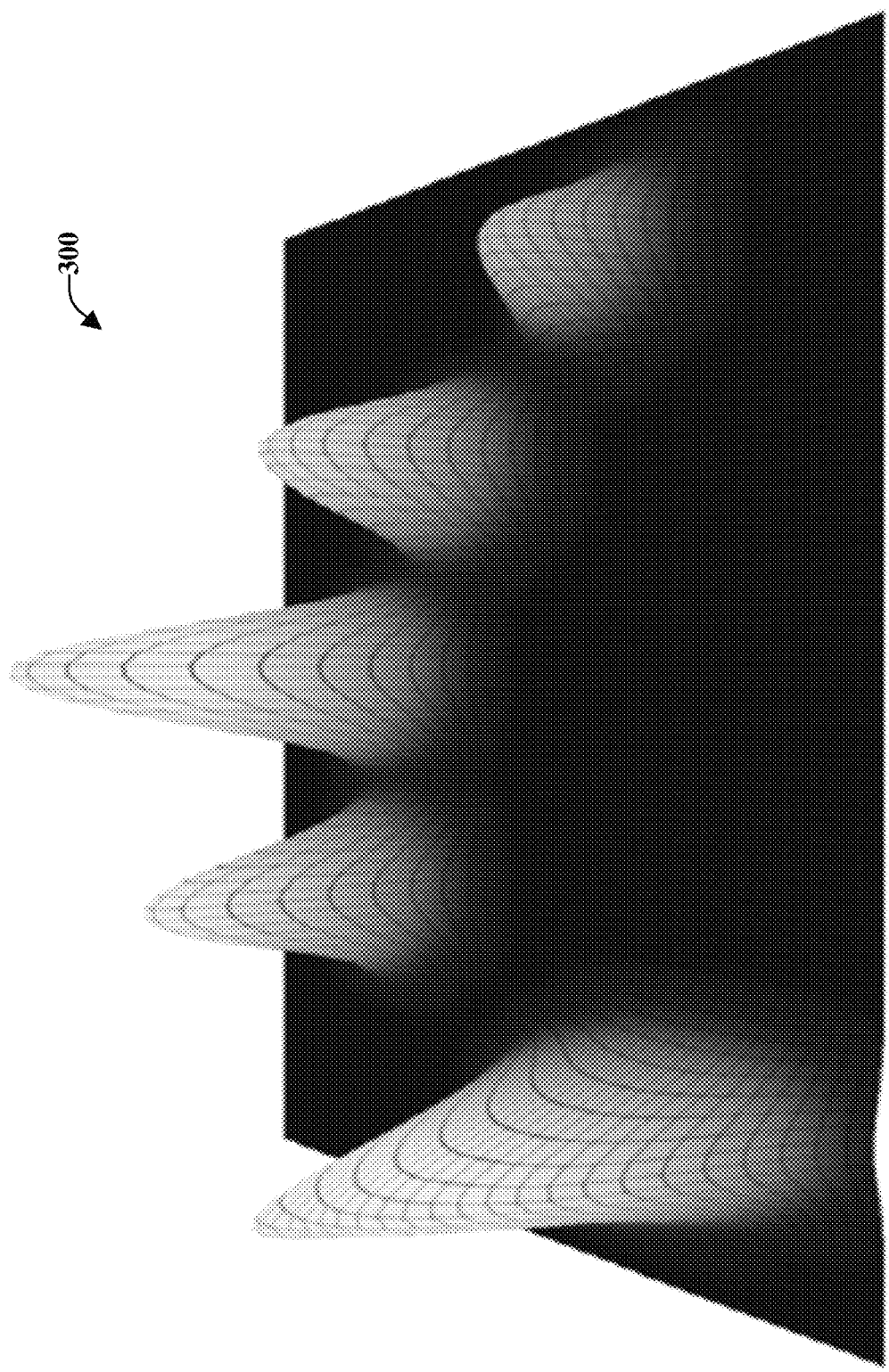
FIG. 3 illustrates an example, non-limiting, response of a touch sensor in accordance with one or more embodiments described herein.

FIG. 3 illustrates an example, non-limiting, response 300 of a touch sensor in accordance with one or more embodiments described herein. Repetitive description of like elements employed in other embodiments described herein is omitted for sake of brevity. More specifically, FIG. 3 illustrates a high resolution touch image captured by a capacitive-grid sensor (e.g., the capacitive-grid sensor 200 of FIG. 2). As depicted, the signals have smooth profiles, which match the profile of the finger (or other touch element) at the areas where the finger touches the capacitive-grid sensor 200. The signals of FIG. 3 also depict that it is possible to reconstruct the actual shape of the touch element (e.g., the finger).

Figure 4:
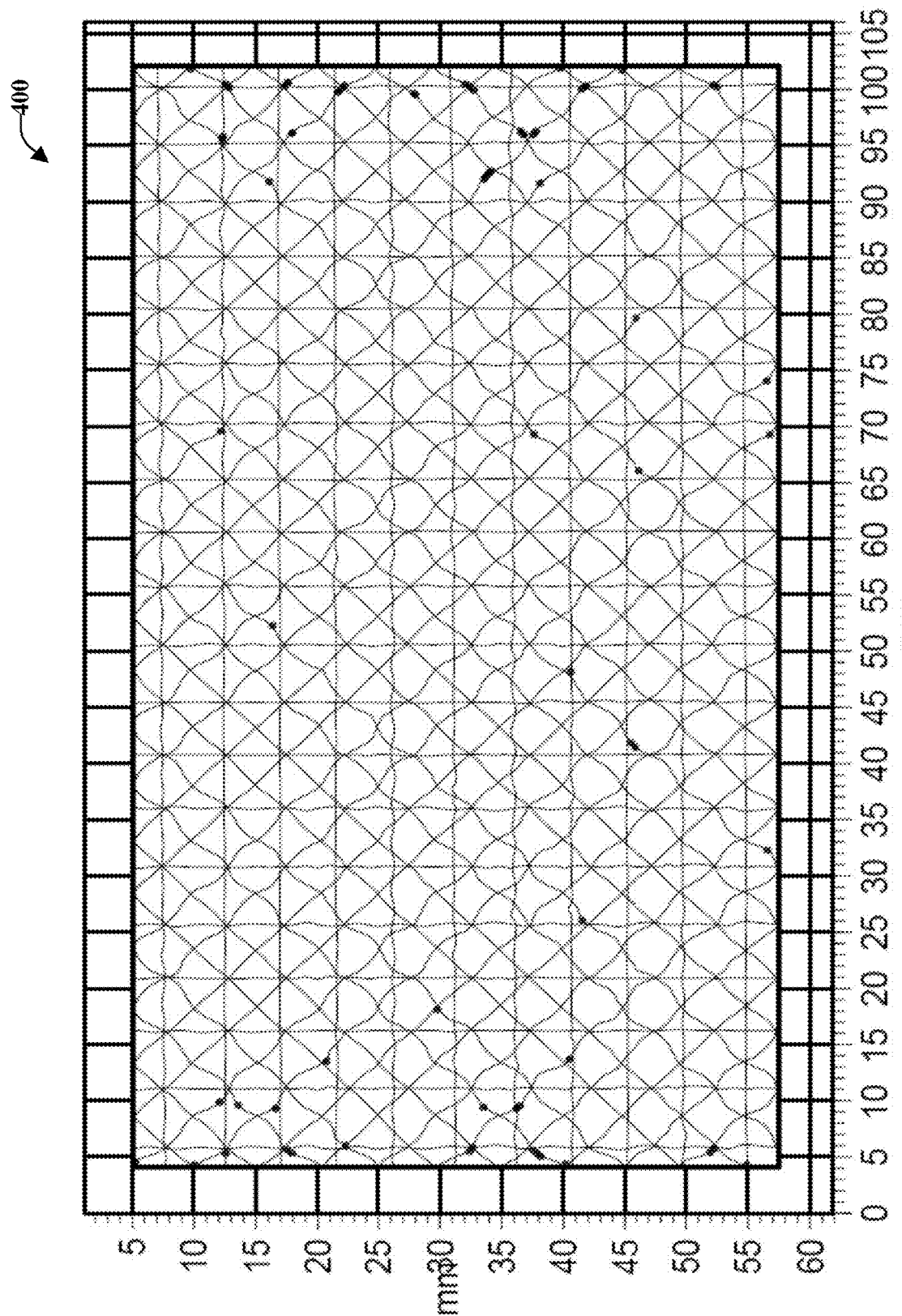
FIG. 4 illustrates example, non-limiting, traces associated with an existing capacitive touch sensor based on one or more touches being detected.
Figure 5:
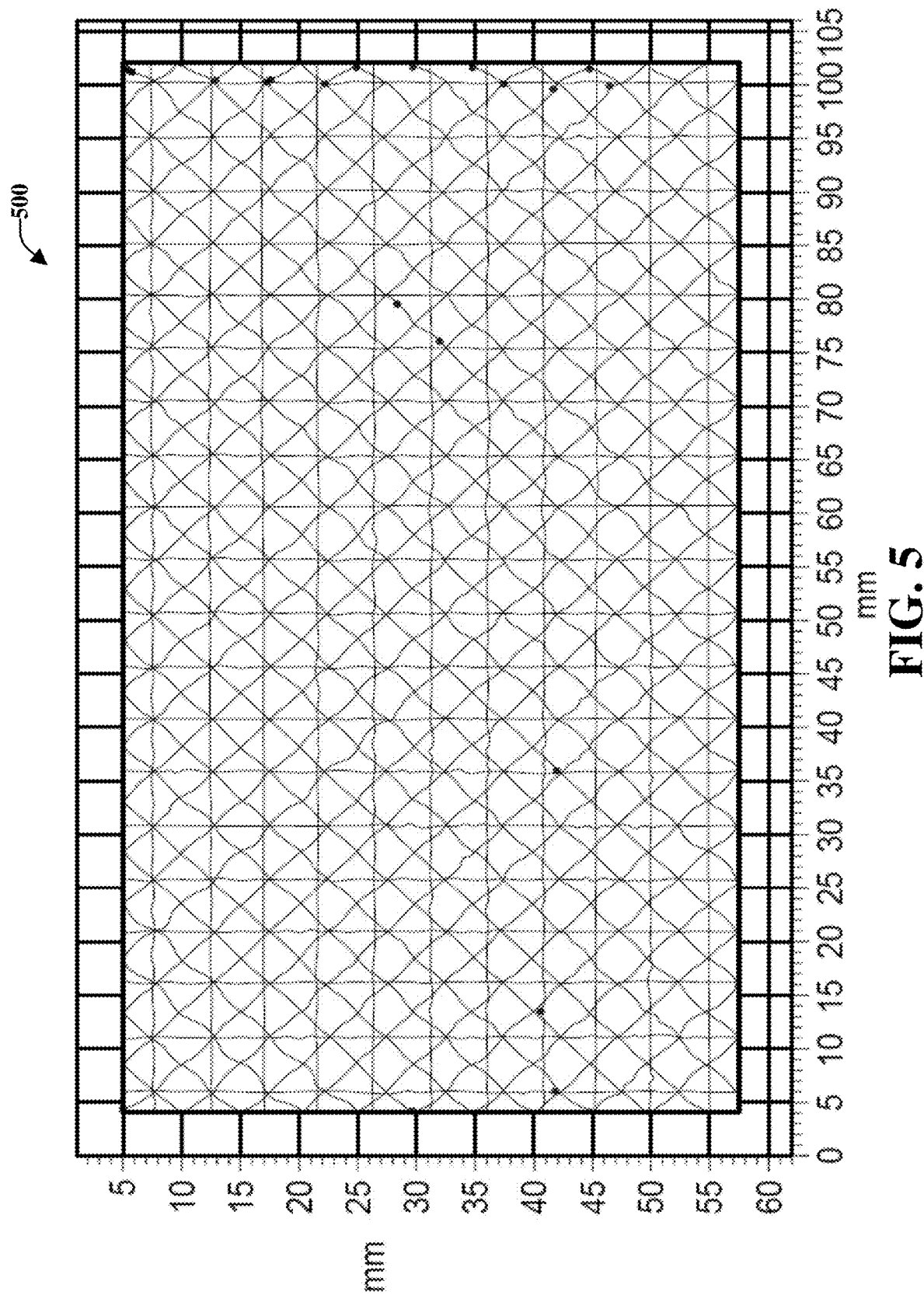
FIG. 5 illustrates example, non-limiting traces associated with a capacitive-grid sensor based on one or more touches being detected in accordance with one or more embodiments described herein.

FIG. 4 illustrates example, non-limiting, traces 400 associated with an existing capacitive touch sensor based on one or more touches being detected. FIG. 5 illustrates example, non-limiting, traces 500 associated with a capacitive-grid sensor based on one or more touches being detected in accordance with one or more embodiments described herein. Repetitive description of like elements employed in other embodiments described herein is omitted for sake of brevity. The traces 400 of FIG. 4 and the traces 500 of FIG. 5 are based on a touch element having a 7 mm tip. The existing capacitive touch sensor that created the traces 400 can be, for example, the capacitive touch sensor 100 of FIG. 1. Further, the traces 500 of FIG. 5 can be created, for example, by the capacitive-grid sensor 200 of FIG. 2 and/or other capacitive-grid sensors as discussed herein.

The darker areas of the traces in FIG. 4 and FIG. 5 indicate areas that would fail a touchpad test. As depicted, the traces 500 of FIG. 5 are straighter than the traces 400 of FIG. 4. Accordingly, the capacitive-grid sensor that detected the traces 500 of FIG. 5 is more linear than the existing capacitive touch sensor that detected the traces 400 of FIG. 4. The linearity is the deviation from where a touch is detected versus where the touch is believed to be placed (e.g., where a user believes she is touching with her finger).

It is noted that the traces 400 and the traces 500 are captured from a test robot, which is moving in a perfectly straight line to draw diagonal lines on the respective sensor. The sensor records the position detected, which are output as the traces (e.g., traces 400 and traces 500). Based on a comparison between FIG. 4 and FIG. 5, the traces 500 of FIG. 5 are more representative of the perfectly straight diagonal line drawn by the test robot. In contrast, the traces 400 of FIG. 4 show a non-linear response.

As mentioned above, to correct for the non-linear response of FIG. 4, calibration (and at times a large amount of calibration) is performed, such as through the use of lookup tables. For example, a lookup table can map a touch to where that touch should be (e.g., if touch is detected at a first location, the lookup table maps the first location to a second location where the touch should be recorded as being received). Additionally, or alternatively, to compensate for the nonlinearity of the traces 400 of FIG. 4, the data can be smoothed. However, the calibration through the use of lookup tables, smoothing the data, and so on, are approximations and add latency, which causes the sensor to not be as responsive as expected by a user of the sensor. In addition, calibration is only an approximation since the calibration changes with the size and shape of the touch element (e.g., the finger). The capacitive-grid sensor embodiments provided herein provide a linear response and, therefore, can mitigate and/or reduce the amount of calibration used, if any calibration is needed. For example, capacitive-grid sensor embodiments provided herein do not use impedance elements, instead, the structure of the electrodes is configured to provide the linear response.

It is noted that the traces 500 of FIG. 5 have a twenty-seven percent (27%) improvement in linearity error as compared to the traces 400 of FIG. 4. For example, the ninety-ninth ($99^{th}$) percentile linearity error of the existing capacitive touch sensor that produced the traces 400 of FIG. 4 is 0.44 mm. In comparison, the $99^{th}$ percentile linearity error of the disclosed embodiments (e.g., the capacitive-grid) that produced the traces 500 of FIG. 5 is 0.32 mm.

Figure 6:
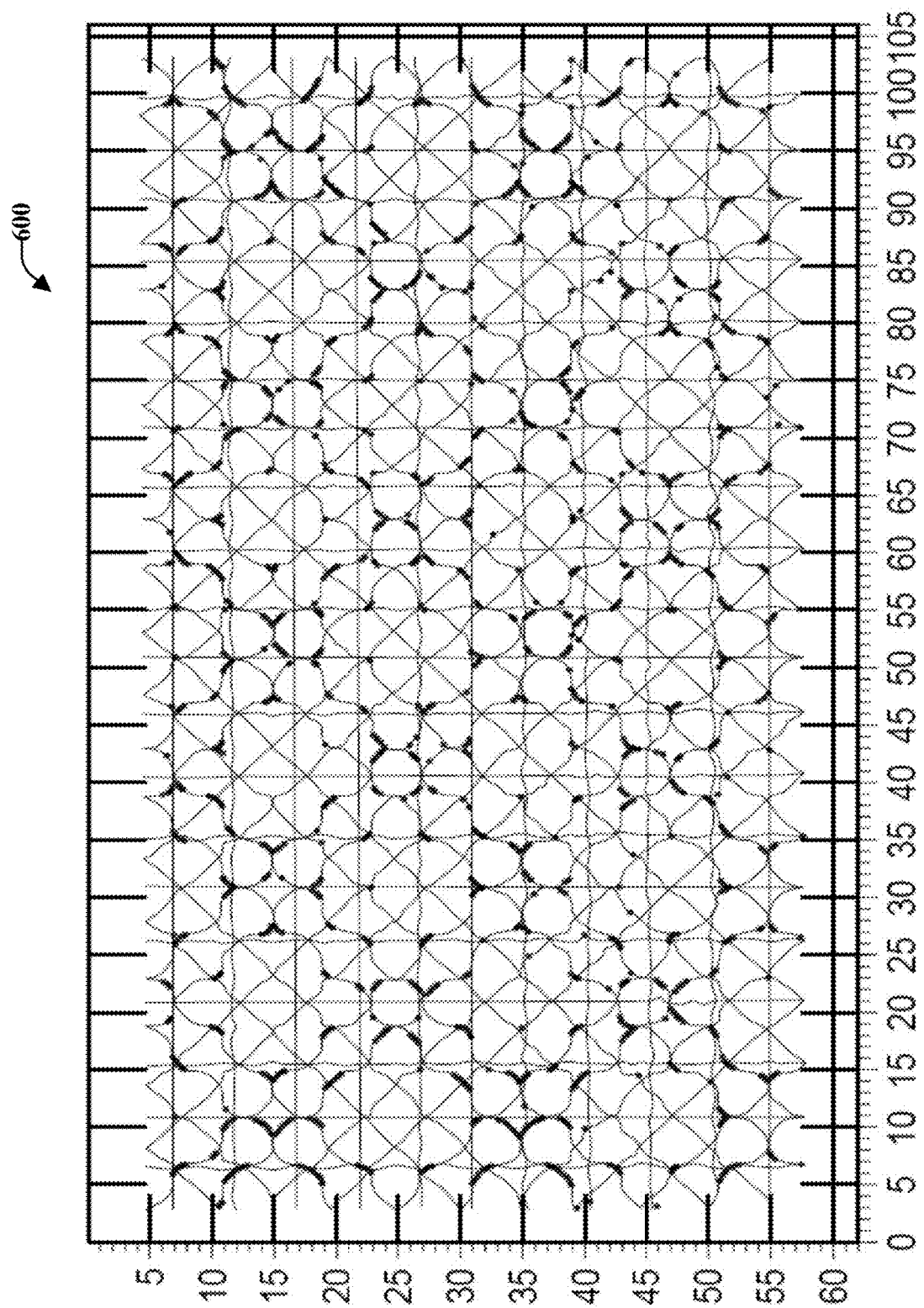
FIG. 6 illustrates example, non-limiting, traces determined based on one or more touches being detected with an existing capacitive touch sensor.
Figure 7:
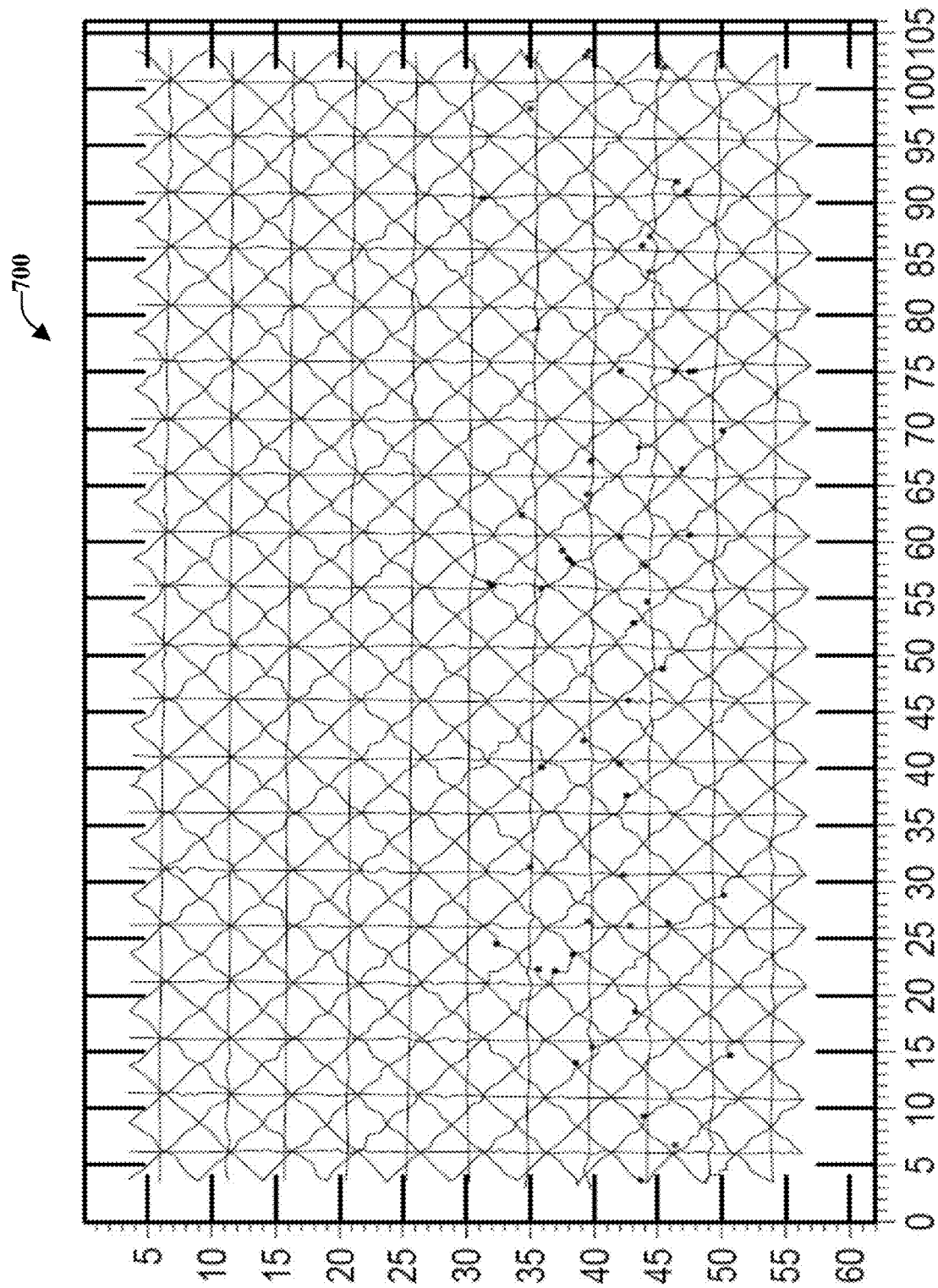
FIG. 7 illustrates example, non-limiting traces associated with a capacitive-grid sensor based on one or more touches being detected in accordance with one or more embodiments described herein.

FIG. 6 illustrates example, non-limiting, traces 600 determined based on one or more touches being detected with an existing capacitive touch sensor. FIG. 7 illustrates example, non-limiting, traces 700 associated with a capacitive-grid sensor based on one or more touches being detected in accordance with one or more embodiments described herein. Repetitive description of like elements employed in other embodiments described herein is omitted for sake of brevity.

The existing capacitive touch sensor that created the traces 600 can be, for example, the capacitive touch sensor 100 of FIG. 1. Further, the traces 700 of FIG. 7 can be created, for example, by the capacitive-grid sensor 200 of FIG. 2 and/or other capacitive-grid sensors as discussed herein. The traces 600 of FIG. 6 and the traces 700 of FIG. 7 are based on a touch element having a 4 mm tip and were created with a test robot, as discussed above.

In this case, the traces 700 of FIG. 7 have a thirty-seven percent (37%) improvement in linearity error as compared to the traces 600 of FIG. 6. For example, the $99^{th}$ percentile linearity error of the existing capacitive touch sensor that produced the traces 600 of FIG. 6 is 0.65 mm. In comparison, the $99^{th}$ percentile linearity error of the disclosed embodiments (e.g., the capacitive-grid) that produced the traces 700 of FIG. 7 is 0.41 mm. It is noted that traces 600 and 700 have a stronger effect as compared to traces 400 and 500. The stronger effect is due to the smaller touch. An even finer touch, such as a stylist tip, will have an effect that is even more pronounced.

Further, the darker traces in FIG. 6 and FIG. 7 indicate areas that are failing. For example, these areas would fail a touchpad test, such as a touchpad test that detects errors greater than around 0.5 mm. It is noted that the darker areas of the traces 600 of FIG. 6 are not just areas of failure, but there are patterns to the errors. Accordingly, when drawing a line, for example, such a pattern will become obvious. The error as discussed herein is with respect to linearity. Each trace is a diagonal line. If a line is drawn through the center of the path, the error is measuring the distance of that line to the path. In other words, linearity refers to the distance from the best fit line.

As mentioned, the one or more capacitive-grid sensor architectures discussed herein are purely capacitive interpolation architectures. Advantages associated with the disclosed embodiments is that these architectures can eliminate impedance elements entirely, utilizing electrode density to control the sensitivity gradient. Further, the disclosed embodiments allow for the use of less components and, as such, reduces fabrication and manufacturing costs (e.g., bill of materials (BOM) and SMT costs). Further, the disclosed embodiments improve the reliability of SMT due to less components being needed. Another advantage is that the disclosed architectures allow for drilling less (e.g., fewer) microvias during PCB fabrication. Further, the disclosed embodiments improve the PCB layout and trace routing quality and/or numbers for the benefit of non-interpolation resistance architecture. Additionally, the disclosed embodiments improve the power consumption of drive and sense scanning.

As discussed with respect to the above figures, existing capacitance structures with a pitch of approximately 4 mm have low linearity. For capacitance structures having a pitch of approximately 1 mm for the drive and sense lines, interpolated resistors between every line is used for higher linearity and resolution performance. This results in four times the number of resistors and traces, which increases the required space to place components and route such components. The disclosed embodiments can achieve an interpolated capacitance architecture on a capacitive touch sensor with compatible linearity performance as compared to an interpolation resistance architecture. Further, the disclosed embodiments use less components and simplify trace routing and fabrication requirements. This results in cost savings and higher reliability. The disclosed embodiments add benefits from the perspective of fabrication and BOM costs and from the perspective of power consumption and reliability. The approaches disclosed herein remove the need for extensive linearity tuning and reduces the amount of software filtering that needs to be performed on the touch data. Further, the approaches disclosed herein yield significant linearity for all touches, and especially smaller touch such as a finger or stylus. Further, the approaches disclosed herein provide more accurate shape and area information for any touch event.

Figure 8A:
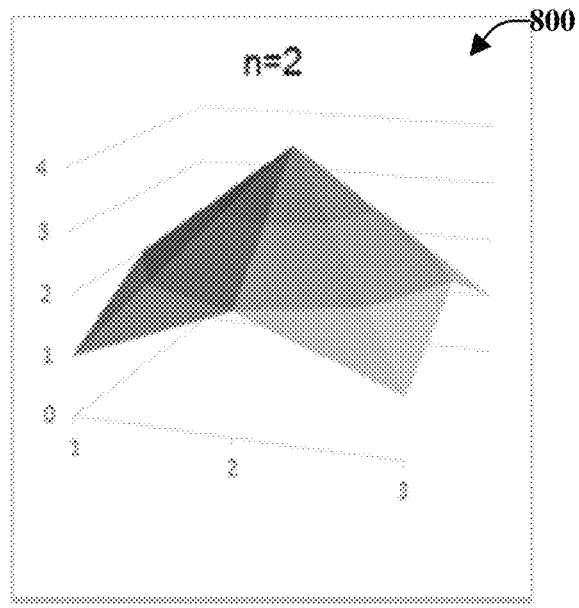
FIGS. 8A, 8B, and 8C illustrate interpolation capacitive-grid sensor patternings in accordance with one or more embodiments described herein.
Figure 8B:
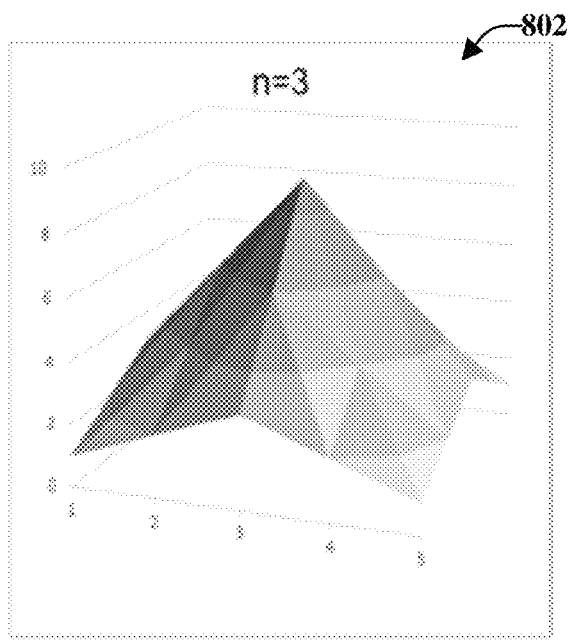
Figure 8C:
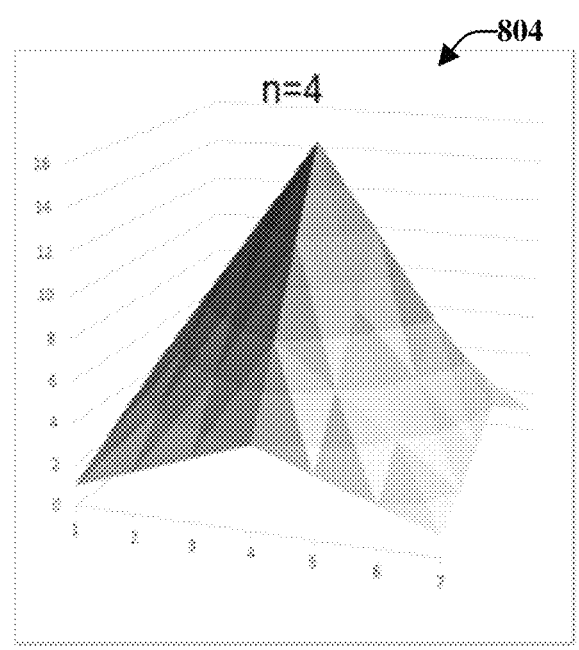

FIGS. 8A, 8B, and 8C illustrate interpolation capacitive-grid sensor patternings in accordance with one or more embodiments described herein. The interpolation patterning is to generate a coupling signal field with arithmetic progression increment from the corner to the center of the active row/column. The 2D normalized coupling signal matrix at the intersection of drive/sense sensitivity gradient is shown in FIGS. 8A, 8B, and 8C. It is noted that although various embodiments are discussed with respect to sense lines and drive lines having a same number or quantity, the disclosed aspects are not limited to this embodiment. Instead, the number of sense lines can be a first quantity and the number of drive lines can be a second quantity, where the first quantity and the second quantity are different. In an embodiment, the first number of sense lines can be more than the second number of drive lines. In another embodiment, the first number of sense lines can be less than the second number of drive lines These figures are with respect to the following matrices, where n and m are integers:

$$\begin{bmatrix} 1 & 2 & \ldots & n & \ldots & 2 & 1 \\ 2 & 4 & \ldots & 2n & \ldots & 4 & 2 \\ \vdots & \vdots & \ddots & \vdots & \ddots & \vdots & \vdots \\ n & 2n & \ldots & n*n & \ldots & 2n & n \\ \vdots & \vdots & \ddots & \vdots & \ddots & \vdots & \vdots \\ 2 & 4 & \ldots & 2n & \ldots & 4 & 2 \\ 1 & 2 & \ldots & n & \ldots & 2 & 1 \end{bmatrix}$$

$$\begin{bmatrix} 1 & 2 & \ldots & n & \ldots & 2 & 1 \\ 2 & 4 & \ldots & 2n & \ldots & 4 & 2 \\ \vdots & \vdots & \ddots & \vdots & \ddots & \vdots & \vdots \\ m & 2m & \ldots & m*n & \ldots & 2m & m \\ \vdots & \vdots & \ddots & \vdots & \ddots & \vdots & \vdots \\ 2 & 4 & \ldots & 2n & \ldots & 4 & 2 \\ 1 & 2 & \ldots & n & \ldots & 2 & 1 \end{bmatrix}$$

It is noted that the y axes for FIGS. 8A through 8C represent a relative coupling signal rather than absolute values.

FIG. 8A illustrates patterning 800 when there are two interpolating electrodes between each pair of active electrodes, thus having an N value of 2 (e.g., n=2), which has the following matrix:

$$\begin{bmatrix} 1 & 2 & 1 \\ 2 & 4 & 2 \\ 1 & 2 & 1 \end{bmatrix}$$

FIG. 8B illustrates patterning 802 when there are three interpolating electrodes between each pair of active electrodes, thus having an N value of 3 (e.g., n=3), which has the following matrix:

$$\begin{bmatrix} 1 & 2 & 3 & 2 & 1 \\ 2 & 4 & 6 & 4 & 2 \\ 3 & 6 & 9 & 6 & 3 \\ 2 & 4 & 6 & 4 & 2 \\ 1 & 2 & 3 & 2 & 1 \end{bmatrix}$$

FIG. 8C illustrates patterning 804 when there are four interpolating electrodes between each pair of active electrodes, thus having an N value of 4 (e.g., n=4), which has the following matrix:

$$\begin{bmatrix} 1 & 2 & 3 & 4 & 3 & 2 & 1 \\ 2 & 4 & 6 & 8 & 6 & 4 & 2 \\ 3 & 6 & 9 & 12 & 9 & 6 & 3 \\ 4 & 8 & 12 & 16 & 12 & 8 & 4 \\ 3 & 6 & 9 & 12 & 9 & 6 & 3 \\ 2 & 4 & 6 & 8 & 6 & 4 & 2 \\ 1 & 2 & 3 & 4 & 3 & 2 & 1 \end{bmatrix}$$

It is noted that, for purposes of simplicity, the following discussion is based on the cases having two interpolating electrodes between each pair of active electrodes (e.g., an N value of 2 (n=2)) and the cases having three interpolating electrodes between each pair of active electrodes (e.g., an N value of 3 (n=3)). As can be determined from FIGS. 8A, 8B, and 8C, the sensitivity fall-off along the x and y directions (e.g., the horizontal and vertical directions) can be created as a function of how many traces are being patterned and, thus, more granularity in the sensitivity fall-off can be achieved.

For the various embodiments discussed herein, there are two versions or structures, which are referred to as a low-density interpolated (LI) version and a high-density interpolated (HI) version. Although discussed with respect to "low" and "high," such wording is utilized to distinguish the different versions or configurations from one another and is not intended to be limiting to one version being "lower" or "higher" than the other version.

Figure 9A:
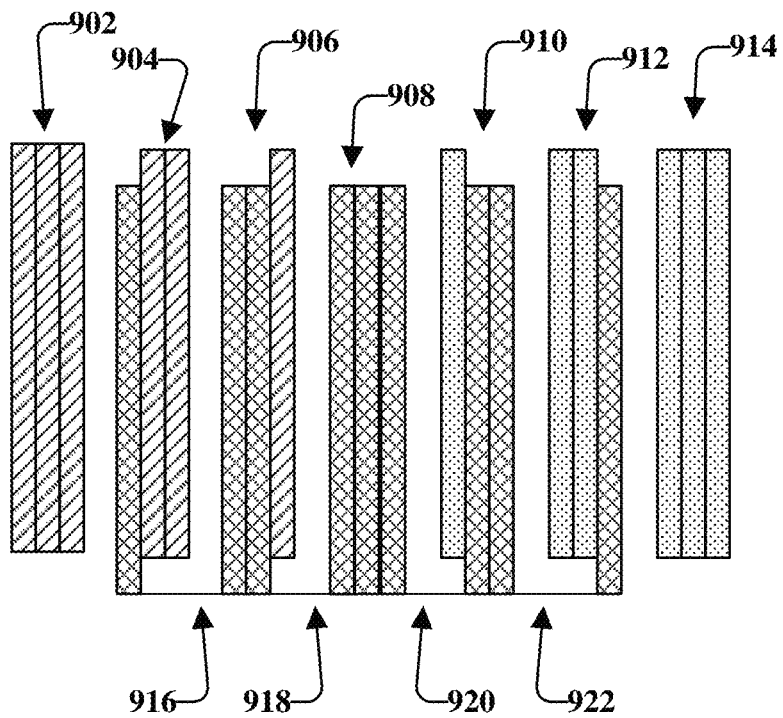
FIG. 9A illustrates an example, non-limiting, schematic representation of a low-density interpolated configuration in accordance with one or more embodiments described herein.

FIG. 9A illustrates an example, non-limiting, schematic representation of a LI version (or low configuration), which is a configuration where sub-electrodes are "bundled" together. The bundles consist of multiple sub-electrodes from the same or different electrodes, as will be described in further detail below. The electrodes (or sub-electrodes) thereof can be column (e.g., sense) electrodes or row (e.g., drive) electrodes. Although discussed with respect to the columns being sense and the rows being drive, the disclosed embodiments are not limited to this implementation and, in some embodiments, the columns can be drive and the rows can be sense. Illustrated in FIG. 9A are three different electrodes (e.g., main electrodes) divided into sub-electrodes, as indicated by the different patterns. In a 1-2-3-2-1 design, the bundles are in groups of three (e.g., 3+0, 2+1, 1+2, 0+3, 1+2, 2+1, 3+0, and so on). For a 1-2-1 design, there will be groups of 2 and so on.

For purposes of explanation, FIG. 9A illustrates the 1-2-3-2-1 design. From left to right, each bundle includes three sub-electrodes, which are bundled (e.g., interdigitated) as follows, where the depicted patterns indicate sub-electrodes of different electrodes. A first bundle 902 includes three sub-electrodes of a first electrode and zero sub-electrodes from another electrode. A second bundle 904 includes two sub-electrodes of the first electrode and one sub-electrode of a second electrode. A third bundle 906 includes one sub-electrode of the first electrode and two sub-electrodes of the second electrode. A fourth bundle 908 includes zero sub-electrodes of another electrode and three sub-electrodes of the second electrode. A fifth bundle 910 includes one sub-electrode of a third electrode and two sub-electrodes of the second electrode. A sixth bundle 912 includes two sub-electrodes of the third electrode and one sub-electrode of the second electrode. Further, a seventh bundle 914 includes three sub-electrodes of the third electrode and zero sub-electrodes of another electrode.

Between the sub-electrodes of each bundle, there are zero gaps, or substantially zero gaps. As utilized herein, "substantially zero gap" refers to the minimal gap allowed by the fabrication process. Further, there are equal gaps (or substantially equal gaps) between the bundles as indicated at 916, 918, 920, and 922. Thus, the LI version either has no gap (e.g., connected) or substantially zero gap within bundles, and gaps between bundles. According to some implementations, when there is a no gap situation in the LI version, there is one trace that is wider. For example, the trace is wider rather than having two or more sub-electrodes having respective smaller widths.

Figure 9B:
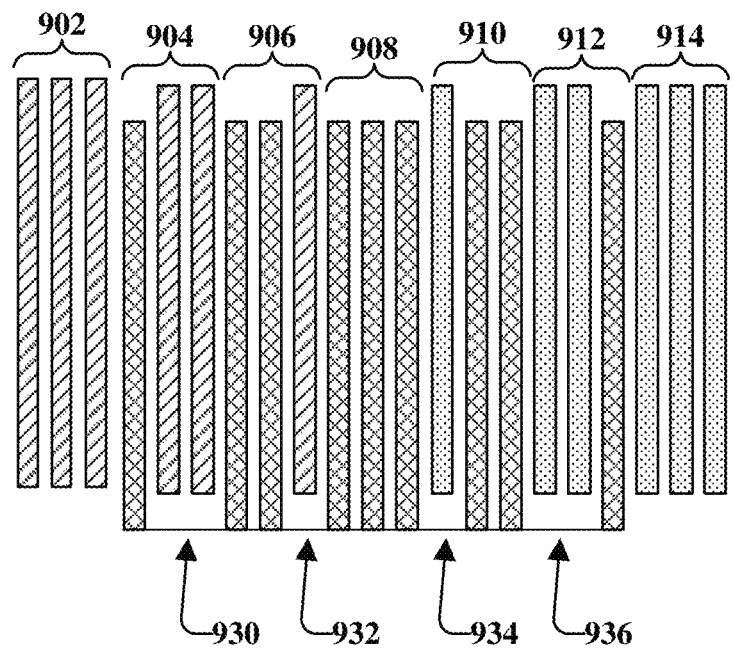
FIG. 9B illustrates an example, non-limiting, schematic representation of a high-density interpolated configuration in accordance with one or more embodiments described herein.

FIG. 9B illustrates an example, non-limiting, schematic representation of a HI version (or high configuration), which is a configuration where the sub-electrodes are "distributed." Repetitive description of like elements employed in other embodiments described herein is omitted for sake of brevity. The electrodes (or sub-electrodes) thereof, can be column (e.g., sense) electrodes or row (e.g., drive) electrodes. In this case, the sub-electrodes are equally (or substantially equally) spaced or have equal (or substantially equal) gaps with its interdigitated neighbors.

By way of example and not limitation, the following will be described with respect to an analogy of the number of teeth of a comb. In an example of the 1-2-3-2-1 combination design, the LI version (e.g., low configuration) will have bundles of 1, 2, 3, 2, and 1 teeth and have either connected or substantially zero gaps within the bundles of 1, 2, 3, 2, and 1 teeth. There will still be gaps between the bundles of the comb and its interdigitated neighboring combs.

In an example of the 1-2-3-2-1 combination design, the HI version (e.g., high configuration) will have 1+2+3+2+1 teeth that are equally spaced and have equal gaps with its interdigitated neighbors.

In both examples provided above, each 1-2-3-2-1 combination with have five groups of teeth (excluding end cases) that are interdigitated with its neighboring combs. Additional details will be provided below.

Figure 12:
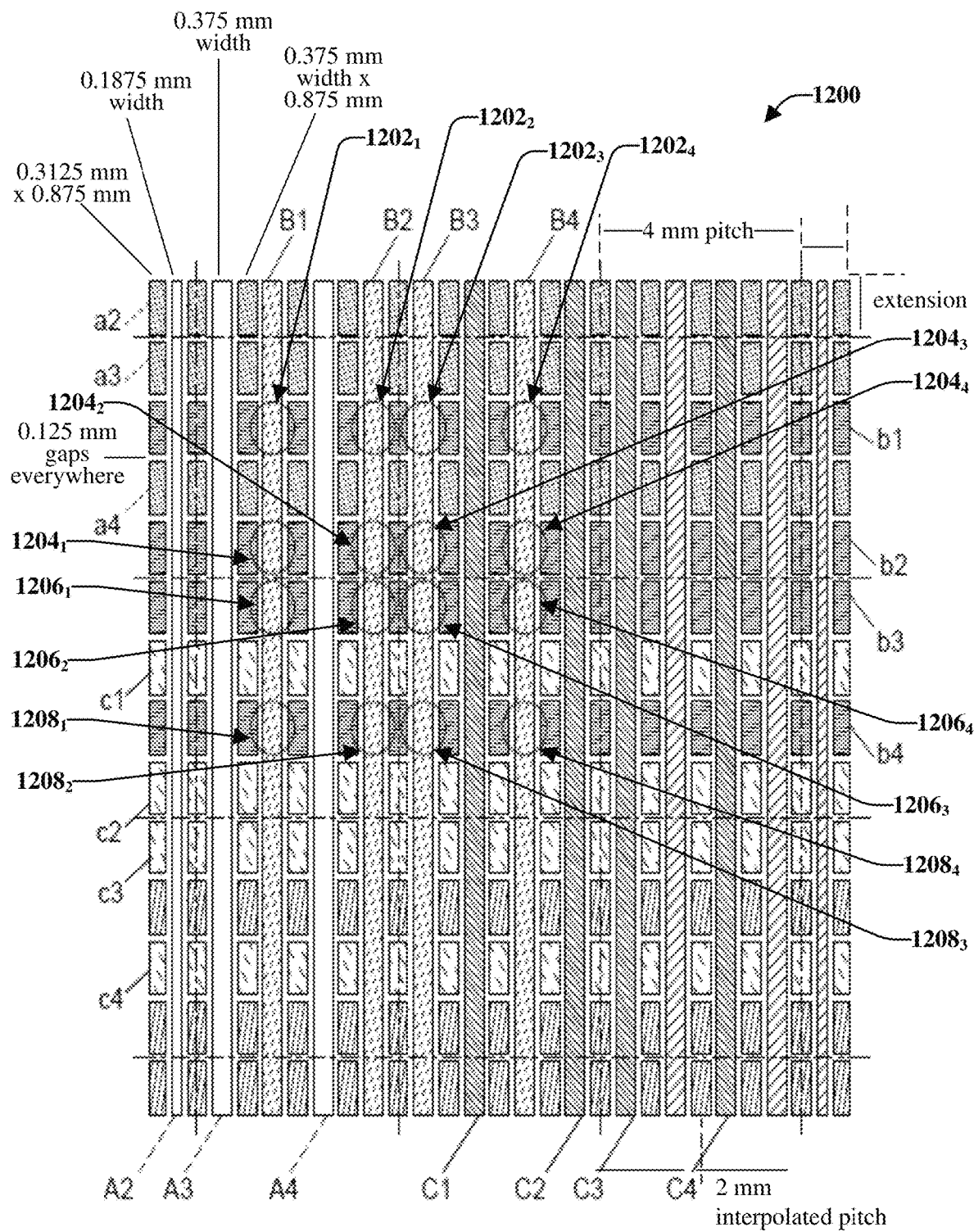
FIG. 12 illustrates an example, non-limiting, physical structure of a high-density interpolated electrode grid in accordance with one or more embodiments described herein.

Thus, a difference between the versions (e.g., LI and HI) is how the traces are being packed into groups. For example, where n=2, there is one additional bundle of traces in between each pair of traces that are usually in the pattern. In the LI version, the bundle is pressed together (as depicted in FIG. 10) and in the HI version, the bundle is spread out (as depicted in FIG. 12), which will be explained in further detail below.

Figure 10:
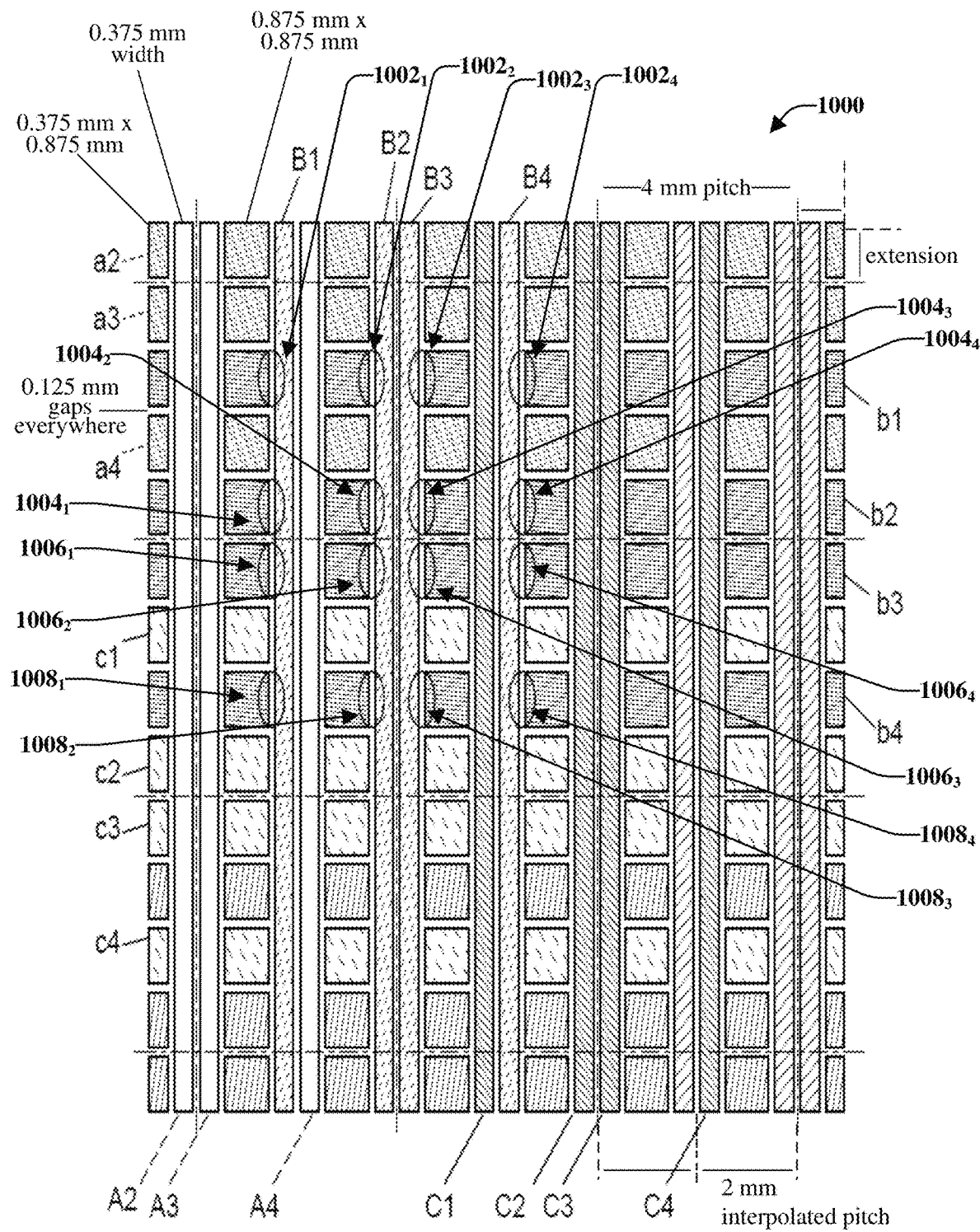
FIG. 10 illustrates an example, non-limiting, physical structure of a low-density interpolated electrode grid in accordance with one or more embodiments described herein.

FIG. 10 illustrates an example, non-limiting, physical structure of a low-density interpolated electrode grid 1000 in accordance with one or more embodiments described herein. The pattern of FIG. 10, as well as other embodiments provided herein, is a periodic pattern. With respect to the LI version patterning illustrated in FIG. 10, the active row/column pitch is 4 mm, as indicated at the top right. Also, there is an extension beyond the edge in a first direction and a second direction. In some implementations, this extension can optionally be removed and/or the extension length can be adjustable. The 2 mm interpolated pitch is indicated at the bottom right. It is noted that the pitch can be different with different values of an m*n matrix. Further, in the embodiment of FIG. 10, the columns have a 0.375 mm width. Respective sizes of the rows are 0.875 mm×0.875 mm. As indicated on the left, there are 0.125 mm gaps everywhere.

The drive lines and sense lines of the capacitor grid are orthogonal on the top layer. The horizontal square pads of same net are electrically connected on Layer 2. The capacitor grid comprises one or more electrodes divided into sub-electrodes. An example of sub-electrode includes lines labeled as B1, B2, B3, and B4. Further, each active row/column has two parts, namely, two center lines (e.g., B2 and B3) and two side lines (B1 and B4), which are electrically connected. Thus, columns labeled as B1, B2, B3, and B4 are electrically connected. In another example, rows labeled c1, c2, c3, and c4 are electrically connected and represent sub-electrodes of an electrode. It is noted that patterning (or colors) are used to indicated columns and/or rows that are electrically connected (e.g., sub-electrodes), as will be discussed below.

The last line of each active row/column is interpolated behind the first line of next active row/column periodically. The circular markers indicate the coupling area between drive and sense lines (also refer to FIG. 14A below). The circular markers indicate the areas that are sensitive to touch. Such regions create the sensitivity fall-off, or the pattern 1-2-1 (top row of circular markers, where the markers are labeled as first marker $1002_1$, second marker $1002_2$, third marker $1002_3$, and fourth marker $1002_4$); 2-4-2 (where the first middle row of markers are labeled as first marker $1004_1$, second marker $1004_2$, third marker $1004_3$, and fourth marker $1004_4$ and where the second middle row of markers are labeled as first marker $1006_1$, second marker $1006_2$, third marker $1006_3$, and fourth marker $1006_4$); and 1-2-1 (bottom row of circular markers where the markers are labeled as first marker $1008_1$, second marker $1008_2$, third marker $1008_3$, and fourth marker $1008_4$).

Each pair of column electrodes comprises two columns of electrodes. Illustrated are seven pairs of electrodes. More specifically, illustrated are a first pair of column electrodes (columns labeled A2 and A3), a second pair of column electrodes (columns labeled B1 and A4), a third pair of column electrodes (columns labeled B2 and B3), a fourth pair of column electrodes (columns labeled C1 and B4), a fifth pair of column electrodes (columns labeled C2 and C3), a sixth pair of column electrodes (first unlabeled column and column labeled C4), and a seventh pair of column electrodes (two unlabeled columns). The first pair of column electrodes, the third pair of column electrodes, the fifth pair of column electrodes, and the seven pair of column electrodes comprise active column electrodes. The second pair of column electrodes, the fourth pair of column electrodes, and the sixth pair of column electrodes comprise interpolating column electrodes between each pair of active column electrodes.

The first pair of column electrodes (active column electrodes, A2 and A3) are electrically connected to one another and to the second column of electrodes (interpolating column electrodes, A4) of the second pair of column electrodes (e.g., A2, A3, and A4 are sub-electrodes of electrode A). The third pair of column electrodes (active column electrodes, B2 and B3) are electrically connected to one another and to the first column electrodes (interpolating column electrodes, B1) of the second pair of column electrodes and the second column electrodes (interpolating column electrodes, B4) of the fourth pair of column electrodes (e.g., B1, B2, B3, and B4 are sub-electrodes of electrode B). The fifth pair of column electrodes (active column electrodes, C2 and C3) are electrically connected to one another and to the first column electrodes (interpolating column electrodes, C1) of the fourth pair of column electrodes and the second column electrodes (interpolating column electrodes, C4) of the sixth pair of column electrodes (e.g., C1, C2, C3, and C4 are sub-electrodes of electrode C). Further, the seventh pair of column electrodes (active column electrodes, unlabeled) are electrically connected to one another and to the first column electrodes (interpolating column electrodes, unlabeled) of the sixth pair of column electrodes.

Further the rows are interleaved. Each pair of row electrodes comprises two rows of electrodes. Illustrated are seven pairs of electrodes. More specifically, illustrated are a first pair of row electrodes (rows labeled a2 and a3), a second pair of row electrodes (rows labeled b1 and a4), a third pair of row electrodes (rows labeled b2 and b3), a fourth pair of row electrodes (rows labeled c1 and b4), a fifth pair of row electrodes (rows labeled c2 and c3), a sixth pair of row electrodes (first unlabeled row and row labeled c4), and a seventh pair of row electrodes (two unlabeled rows). The first pair of row electrodes, the third pair of row electrodes, the fifth pair of row electrodes, and the seven pair of row electrodes comprise active row electrodes. The second pair of row electrodes, the fourth pair of row electrodes, and the sixth pair of row electrodes comprise interpolating row electrodes between each pair of active row electrodes.

The first pair of row electrodes (active row electrodes, a2 and a3) are electrically connected to one another and to the second row of electrodes (interpolating row electrodes, a4) of the second pair of row electrodes (e.g., a2, a3, and a4 are sub-electrodes of electrode a). The third pair of row electrodes (active row electrodes, b2 and b3) are electrically connected to one another and to the first row electrodes (interpolating row electrodes, b1) of the second pair of row electrodes and the second row electrodes (interpolating row electrodes, b4) of the fourth pair of row electrodes (e.g., b1, b2, b3, and b4 are sub-electrodes of electrode b). The fifth pair of row electrodes (active row electrodes, c2 and c3) are electrically connected to one another and to the first row electrodes (interpolating row electrodes, c1) of the fourth pair of row electrodes and the second row electrodes (interpolating row electrodes, c4) of the sixth pair of row electrodes (e.g., c1, c2, c3, and c4 are sub-electrodes of electrode c). Further, the seventh pair of row electrodes (active row electrodes, unlabeled) are electrically connected to one another and to the first row electrodes (interpolating row electrodes, unlabeled) of the sixth pair of row electrodes.

In the L1 structure of FIG. 10, there are two adjacent electrode columns separated by a minimal gap (non-zero). In some implementations the gaps can be the same size. For example, the gap between A2 and A3 can be the same as the gap between A1 and B1, as discussed with respect to FIG. 9A. Thus, the islands between the interpolated pairs (e.g., in this case as it is 1-2-1, or in the case of triples it is a pattern of 1-2-3-2-1) are equal 0.875 island (with 2×0.125 gap). The difference with HI is that the widths of the island and each electrode column are the same and there are islands between each electrode column, as discussed with respect to FIG. 9B. It is noted that the disclosed embodiments are not limited to the gaps being the same size.

Further, respective interpolating electrode columns are located such that another interpolating electrode column (not electrically connected to the active electrode column) is interposed between the active electrode column and its electrically connected interpolating electrode columns. For example, the active electrode columns are electrically connected to a first interpolating electrode column and a second interpolating electrode column. A third interpolating electrode column is interposed, at a first side, between the active electrode columns and the first interpolating electrode column. Further, a fourth interpolating electrode column is interposed, at a second side, between the active electrode columns and the second interpolating electrode column. Further to this example, the third electrode column and the fourth electrode column are not electrically connected to the active electrode columns, the first interpolating electrode column, and the second interpolating electrode column.

In further detail, for example, column A4 is interposed between interpolating electrode column B1 and active electrode columns B2/B3, and column C1 is interposed between interpolating electrode column B4 and active electrode columns B2/B3. In another example, column B4 is interposed between interpolating electrode column C1 and active electrode columns C2/C3, and column unlabeled is interposed between interpolating electrode column C4 and active electrode columns C2/C3.

In a similar manner, respective interpolating electrode rows are located such that another interpolating electrode row (not electrically connected to the active electrode row) is interposed between the active electrode row and its electrically connected interpolating electrode row. For example, row a4 is interposed between interpolating electrode row b1 and active electrode rows b2/b3, and row c1 is interposed between interpolating electrode row c4 and active electrode rows b2/b3. In another example, row b4 is interposed between interpolating electrode row c1 and active electrode rows c2/c3, and column unlabeled is interposed between interpolating electrode row c4 and active electrode rows c2/c3.

Figure 11A:
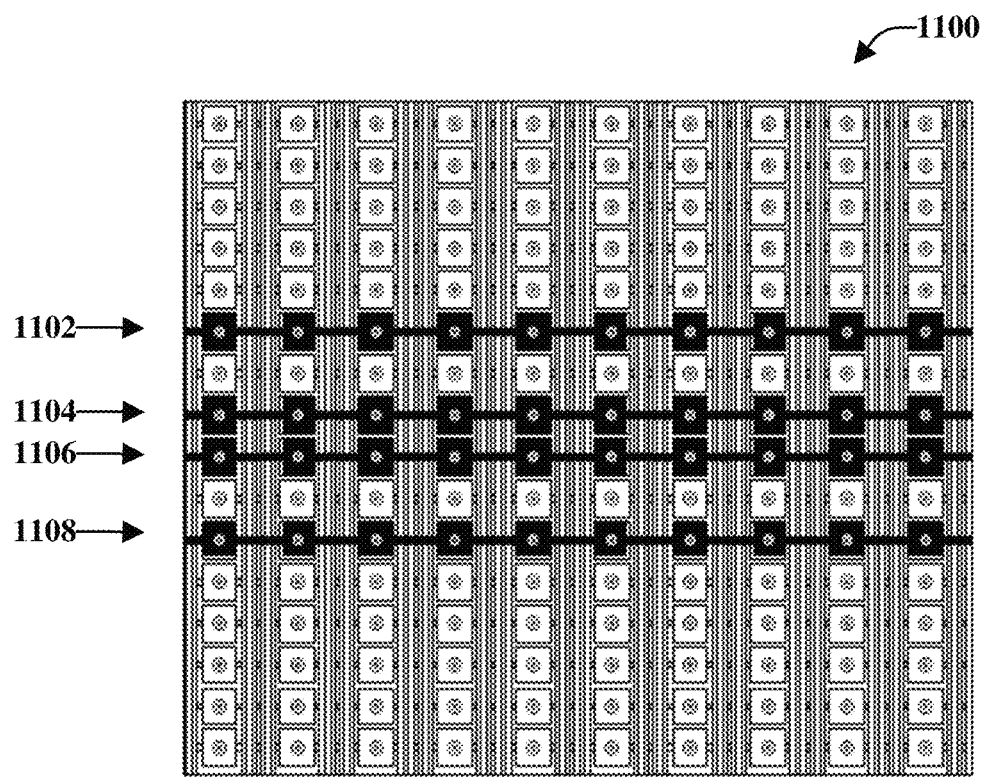
FIG. 11A illustrates an active row of the low-density interpolated electrode grid of FIG. 10 on a printed circuit board in accordance with one or more embodiments described herein.

FIG. 11A illustrates an active row 1100 of the low-density interpolated electrode grid 1000 of FIG. 10 on a printed circuit board in accordance with one or more embodiments described herein. The sub-electrodes in the LI version includes four lines of pads which are connected on Layer 2 with microvias. The lines of pads are indicated in FIG. 11A as lines 1102, 1104, 1106, and 1108. The normalized width of edge-center-edge is 1-2-1.

Figure 11B:
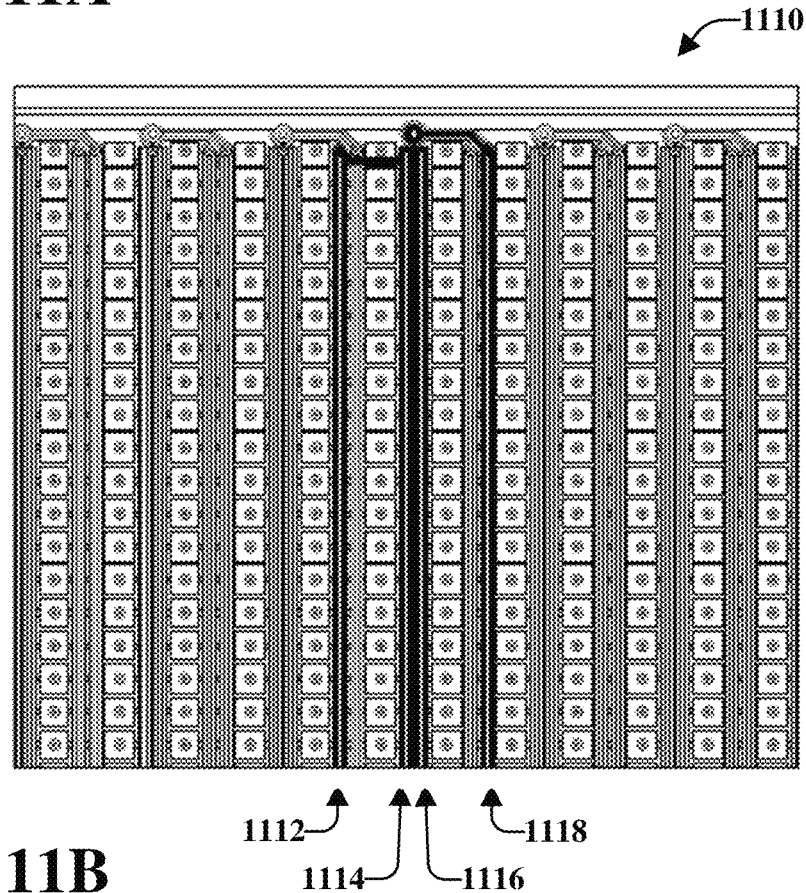
FIG. 11B illustrates an active column of the low-density interpolated electrode grid of FIG. 10 on the printed circuit board in accordance with one or more embodiments described herein.

FIG. 11B illustrates an active column 1110 of the low-density interpolated electrode grid 1000 of FIG. 10 on the printed circuit board in accordance with one or more embodiments described herein. Active column (sense) is orthogonal (the active row) and includes four lines of traces which are also connected on Layer 2 with microvias. The lines of traces are indicated as lines 1112, 1114, 1116, and 1118. The normalized width of edge-center-edge is 1-2-1.

FIG. 12 illustrates an example, non-limiting, physical structure of a high-density interpolated electrode grid 1200 in accordance with one or more embodiments described herein. With respect to the HI version patterning of FIG. 12, the active row/column pitch is 4 mm, as indicated at the top right. Also, there is an extension beyond the edge in a first direction and a second direction. In some implementations, this extension can optionally be removed and/or the extension length can be adjustable. The 2 mm interpolated pitch is indicated at the bottom right. In various embodiments, the pitch can be different with different values of m*n matrix. In the example of FIG. 10, the columns, have a 0.375 mm width, respective sizes of the rows are 0.375 mm width× 0.875 mm. As indicated on the left, there are 0.125 mm gaps everywhere.

The drive lines and sense lines are orthogonal on the top layer. The horizontal rectangle pads of same electrical net are electrically connected on Layer 2. Further, each active row/column has two parts, namely, two center lines and two side lines, which are electrically connected. For example, B1, B2, B3, and B4 are electrically connected and represent sub-electrodes of electrode B. In another example, c1, c2, c3, and c4 are electrically connected and represent sub-electrodes of electrode c. It is noted that patterning (or colors) are used to indicated columns and/or rows that are electrically connected, as will be discussed below.

The last line of each active row/column is interpolated behind the first line of next active row/column periodically. The circular markers show the coupling area between drive and sense lines (also refer to FIG. 14B below). The circular markers indicate the areas that are sensitive to touch. For example, as illustrated in FIG. 12, a coupling area between the drive and sense lines create a sensitivity fall-off, or the pattern 1-2-1; 2-4-2; and 1-2-1. The first pattern 1-2-1, is indicated by a top row of circular markers $1202_1$, $1202_2$, $1202_3$, and $1202_4$. There are two middle rows of coupling areas between the drive and sense lines, which create a pattern of 2-4-2, which are indicated by a first middle row of circular markers $1204_1$, $1204_2$, $1204_3$, and $1204_4$, and a second middle row of circular markers $1206_1$, $1206_2$, $1206_3$, and $1206_4$. Further, another coupling area between the drive and sense lines create another pattern 1-2-1, which is indicated by a bottom row of circular markers $1208_1$, $1208_2$, $1208_3$, and $1208_4$. The sensitivity pattern is created by interleaving the traces. The intersection of the lines depicts the sensitivity fall-off, which is repeated at each intersection as a function of the pattern of traces. By comparing the areas of sensitivity fall-off in FIG. 10 and the areas of sensitivity fall-off in FIG. 12, the high-density interpolated electrode grid 1200 has double the amount of areas of sensitivity fall-off than the low-density interpolated electrode grid 1000. In other words, the high-density interpolated electrode grid 1200 has double the number of sensitive areas between the rows and columns as compared to the low-density interpolated electrode grid 1000.

Each pair of column electrodes comprises two columns of electrodes. Illustrated are seven pairs of electrodes. More specifically, illustrated are a first pair of column electrodes (columns labeled A2 and A3), a second pair of column electrodes (columns labeled B1 and A4), a third pair of column electrodes (columns labeled B2 and B3), a fourth pair of column electrodes (columns labeled C1 and B4), a fifth pair of column electrodes (columns labeled C2 and C3), a sixth pair of column electrodes (first unlabeled column and column labeled C4), and a seventh pair of column electrodes (two unlabeled columns). The first pair of column electrodes, the third pair of column electrodes, the fifth pair of column electrodes, and the seven pair of column electrodes comprise active column electrodes. The second pair of column electrodes, the fourth pair of column electrodes, and the sixth pair of column electrodes comprise interpolating column electrodes between each pair of active column electrodes.

The first pair of column electrodes (active column electrodes, A2 and A3) are electrically connected to one another and to the second column of electrodes (interpolating column electrodes, A4) of the second pair of column electrodes (e.g., A2, A3, and A4 are sub-electrodes of electrode A). The third pair of column electrodes (active column electrodes, B2 and B3) are electrically connected to one another and to the first column electrodes (interpolating column electrodes, B1) of the second pair of column electrodes and the second column electrodes (interpolating column electrodes, B4) of the fourth pair of column electrodes (e.g., B1, B2, B3, and B4 are sub-electrodes of electrode B). The fifth pair of column electrodes (active column electrodes, C2 and C3) are electrically connected to one another and to the first column electrodes (interpolating column electrodes, C1) of the fourth pair of column electrodes and the second column electrodes (interpolating column electrodes, C4) of the sixth pair of column electrodes (e.g., C1, C2, C3, and C4 are sub-electrodes of electrode C). Further, the seventh pair of column electrodes (active column electrodes, unlabeled) are electrically connected to one another and to the first column electrodes (interpolating column electrodes, unlabeled) of the sixth pair of column electrodes.

Further the rows are interleaved. Each pair of row electrodes comprises two rows of electrodes. Illustrated are seven pairs of electrodes. More specifically, illustrated are a first pair of row electrodes (rows labeled a2 and a3), a second pair of row electrodes (rows labeled b1 and a4), a third pair of row electrodes (rows labeled b2 and b3), a fourth pair of row electrodes (rows labeled c1 and b4), a fifth pair of row electrodes (rows labeled c2 and c3), a sixth pair of row electrodes (first unlabeled row and row labeled c4), and a seventh pair of row electrodes (two unlabeled rows). The first pair of row electrodes, the third pair of row electrodes, the fifth pair of row electrodes, and the seven pair of row electrodes comprise active row electrodes. The second pair of row electrodes, the fourth pair of row electrodes, and the sixth pair of row electrodes comprise interpolating row electrodes between each pair of active row electrodes.

The first pair of row electrodes (active row electrodes, a2 and a3) are electrically connected to one another and to the second row of electrodes (interpolating row electrodes, a4) of the second pair of row electrodes (e.g., a2, a3, and a4 are sub-electrodes of electrode a). The third pair of row electrodes (active row electrodes, b2 and b3) are electrically connected to one another and to the first row electrodes (interpolating row electrodes, b1) of the second pair of row electrodes and the second row electrodes (interpolating row electrodes, b4) of the fourth pair of row electrodes (e.g., b1, b2, b3, and b4 are sub-electrodes of electrode b). The fifth pair of row electrodes (active row electrodes, c2 and c3) are electrically connected to one another and to the first row electrodes (interpolating row electrodes, c1) of the fourth pair of row electrodes and the second row electrodes (interpolating row electrodes, c4) of the sixth pair of row electrodes (e.g., c1, c2, c3, and c4 are sub-electrodes of electrode c). Further, the seventh pair of row electrodes (active row electrodes, unlabeled) are electrically connected to one another and to the first row electrodes (interpolating row electrodes, unlabeled) of the sixth pair of row electrodes.

Figure 13A:
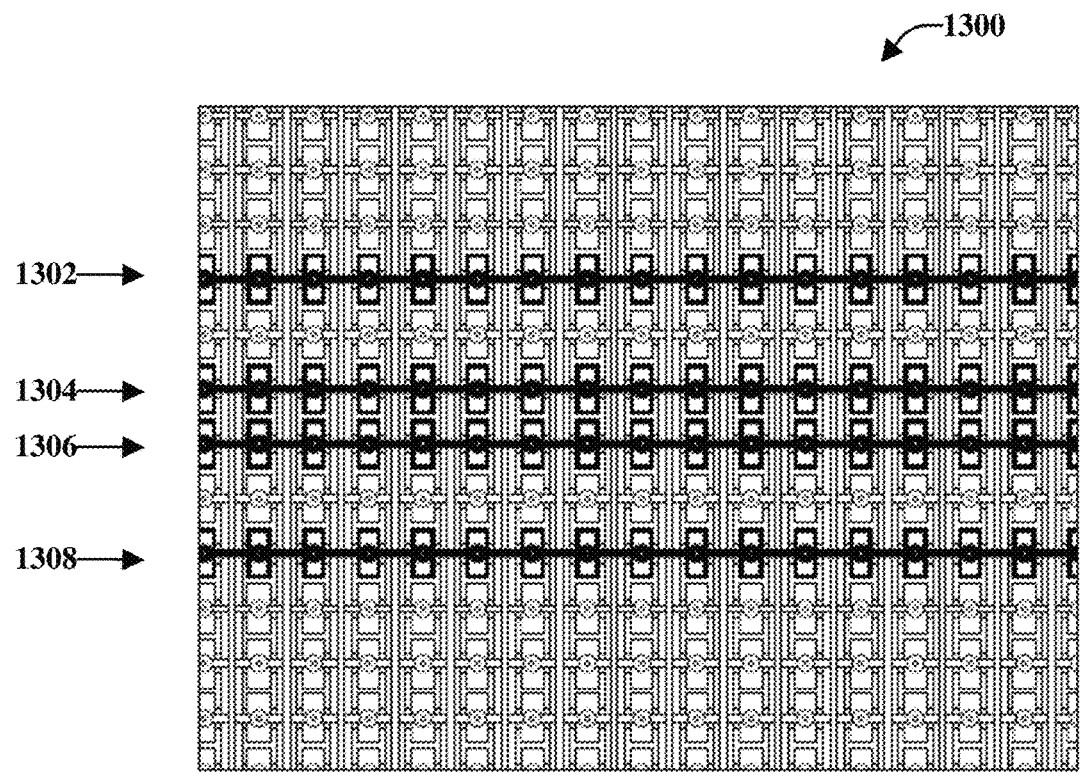
FIG. 13A illustrates an active row of the high-density interpolated electrode of FIG. 12 on a printed circuit board in accordance with one or more embodiments described herein.

FIG. 13A illustrates the active row 1300 of the high-density interpolated electrode grid 1200 of FIG. 12 on a printed circuit board in accordance with one or more embodiments described herein. The active row (drive) in the HI version includes four lines of pads which are connected on Layer 2 with microvias. The lines of pads are indicated as lines 1302, 1304, 1306, and 1308. The normalized width of edge-center-edge is 1–2–1.

Figure 13B:
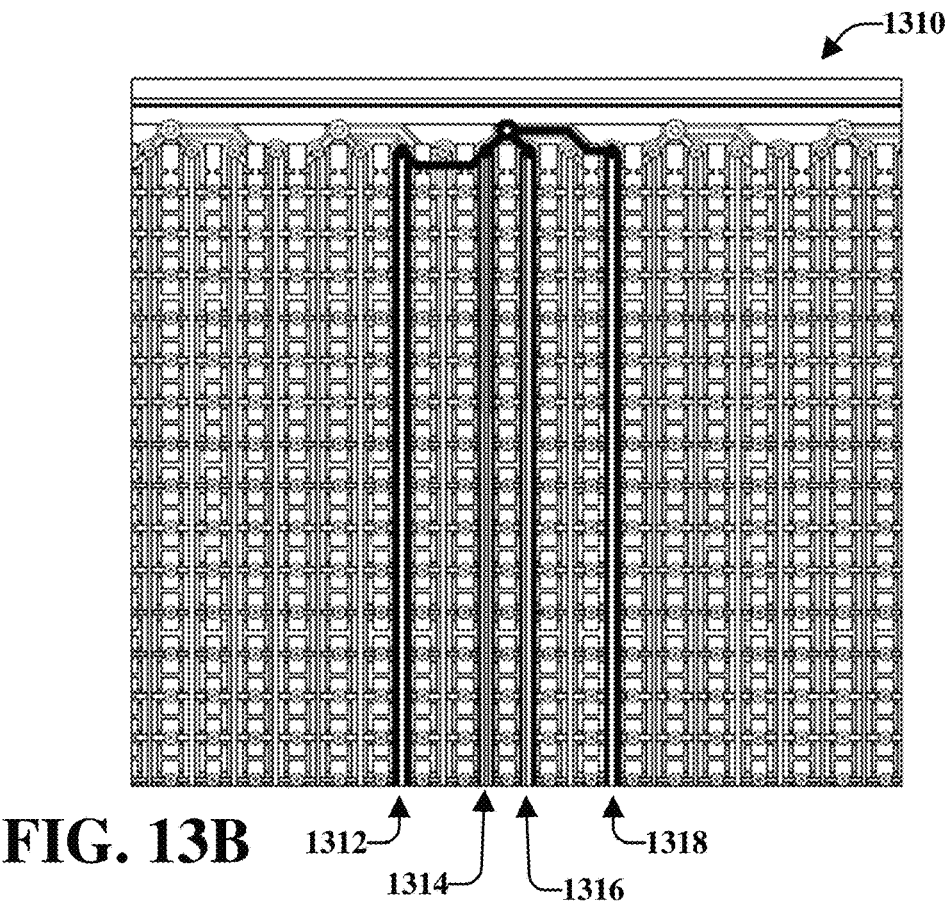
FIG. 13B illustrates an active column of the high-density interpolated electrode grid of FIG. 12 on a printed circuit board in accordance with one or more embodiments described herein.

FIG. 13B illustrates the active column 1310 of the high-density interpolated electrode grid 1200 of FIG. 12 on a printed circuit board in accordance with one or more embodiments described herein. Active column (sense) is orthogonal and includes four lines of traces which are also connected on Layer 2 with microvias. The lines of traces are indicated as lines 1312, 1314, 1316, and 1318. The normalized width of edge-center-edge is 1–2–1.

It is noted that the HI version is similar to the LI version. However, in the HI version, the traces are separated and in the LI version, the traces are closer together. Another difference is that the HI version can be more expensive to fabricate due to the HI version having more microvias than the LI version. Further, the HI version has a slightly better linearity as compared to the LI version. Therefore, there is a tradeoff between fabrication costs and better linearity.

Figure 14A:
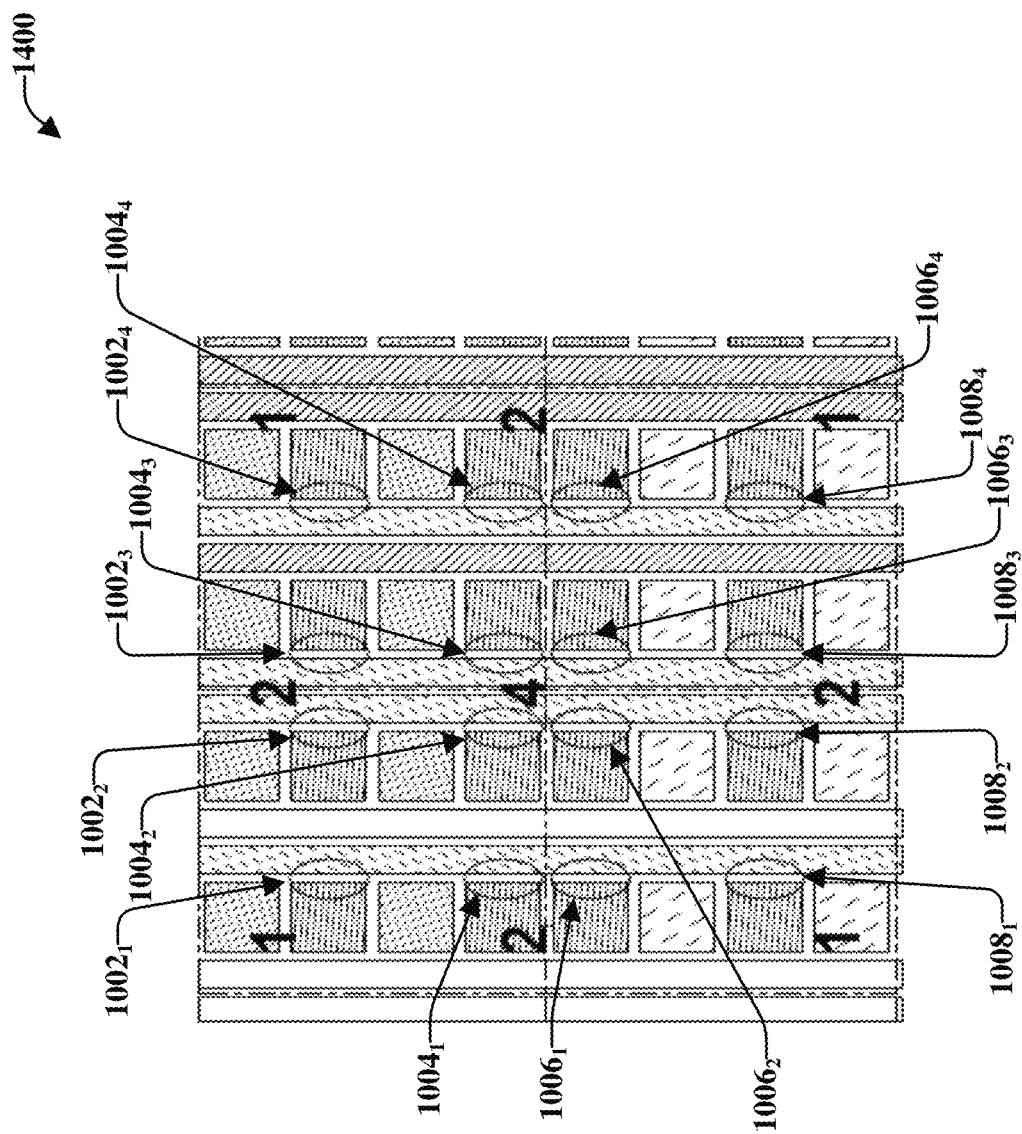
FIG. 14A and FIG. 14B illustrate comparisons of respective sensitivity fall-offs for a low-density interpolated electrode grid and a high-density interpolated electrode grid having the pattern 1-2-1 in accordance with one or more embodiments described herein.
Figure 14B:
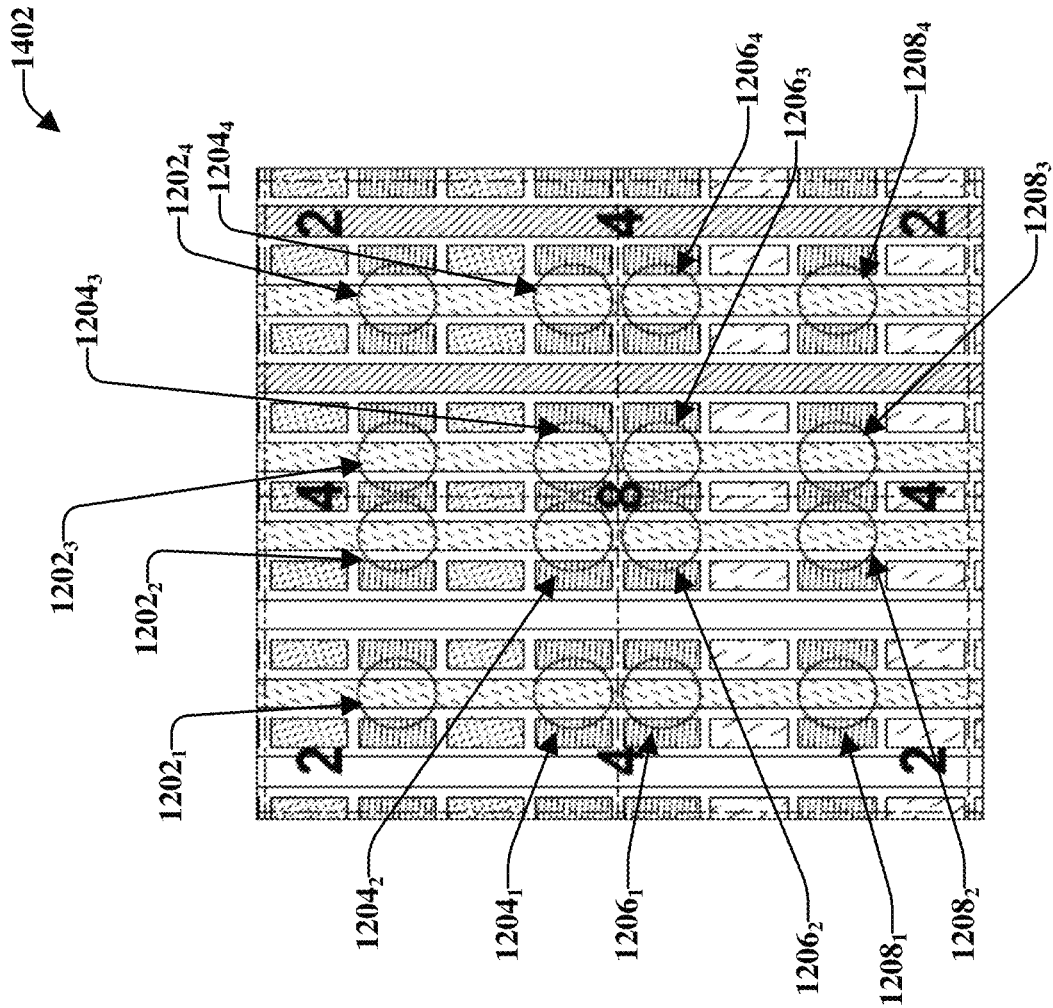

FIGS. 14A and 14B illustrate comparisons of respective sensitivity fall-offs for a low-density interpolated electrode grid (FIG. 14A) and a high-density interpolated electrode grid (FIG. 14B) having the pattern 1–2–1 in accordance with one or more embodiments described herein. Repetitive description of like elements employed in other embodiments described herein is omitted for sake of brevity.

Illustrated at 1400 of FIG. 14A is a portion of the physical structure of the low-density interpolated electrode grid 1000 of FIG. 10 and, more specifically, the circular markers showing the coupling area between drive and sense lines. Further, illustrated at 1402 of FIG. 14B is a portion of the physical structure of the high-density interpolated electrode grid 1200 of FIG. 12, and, more specifically, the circular markers showing the coupling area between drive and sense lines. The following matrix can be utilized with FIG. 14A.

$$\begin{bmatrix} 1 & 2 & 1 \\ 2 & 4 & 2 \\ 1 & 2 & 1 \end{bmatrix}$$

The comparison of FIGS. 14A and 14B are examples of how the disclosed embodiments can improve the linearity without interpolation resistors (or other impedance elements). Considering normalized coupling signal at the intersection of two lines is 1 (a.u.), thus, the signal at the intersection of lines B2/B3 and lines b2/b3 is 4 (a.u.); the signal at the intersection of B1 and b2/b3 is 2 (a.u.);and the signal at the intersection of B1 and b1 is 1 (a.u.). This pattern enables capacitive coupling signal strength to vary in intensity at different locations. Further, this results in a high linearity of the capacitive touch sensor.

The following will describe some differences between the LI version and the HI version. In the LI version, there are four coupling areas between the drive lines and sense lines at the center of each grid. In the HI version, there are eight coupling areas between the drive and sense lines at the center of each grid. It is the same to other locations at the edge corners, where the HI version has twice the number coupling areas. Thus, the HI version has stronger coupling than the LI version. However, the LI version uses less microvias for the connection in Layer 2 of PCB, resulting in a simpler fabrication process.

The capacitive-grid sensors discussed herein, including the alternative embodiments that will be discussed below, have multiple use cases including, for example, touch pads, gaming, stylist interaction, the obtainment of more precise information for various purposes, and so on. For example, touch pads can be extremely sensitive (e.g., a small movement of a finger results in a large movement of a cursor on a screen). Thus, there is a large gain in the sensitivity of the touch pad. Accordingly, the capacitive-grid sensors discussed herein can facilitate a more accurate and responsive touch pad.

In another example, for gaming applications, generally a mouse is used to control various functions since a mouse has a higher level of precision. However, with implementation of the disclosed embodiments, a touch pad on a game control, for example, can provide as much precision, or more precision, than use of a mouse. Further, as it relates to stylist interaction when drawing, for example, using hovering, there are times when the software will indicate if a touch is likely to occur. The hover is imprecise for similar reasons as the non-linearity in a sensor. Thus, the capacitive-grid sensors discussed herein, with its linear response, can facilitate stylist hover that is more precise.

Another use case is the obtainment of more precise information about the touch area, the shape of the touch, and statistics related to the touch, which can be more precise because the disclosed embodiments are not as dependent on the position of the finger (or other touch element). The information about the touch can be input into various learning processes, neural networks, and so on, for predictive typing and other functions. With more precise data, various learning procedures can be performed related to the touch.

Figure 15:
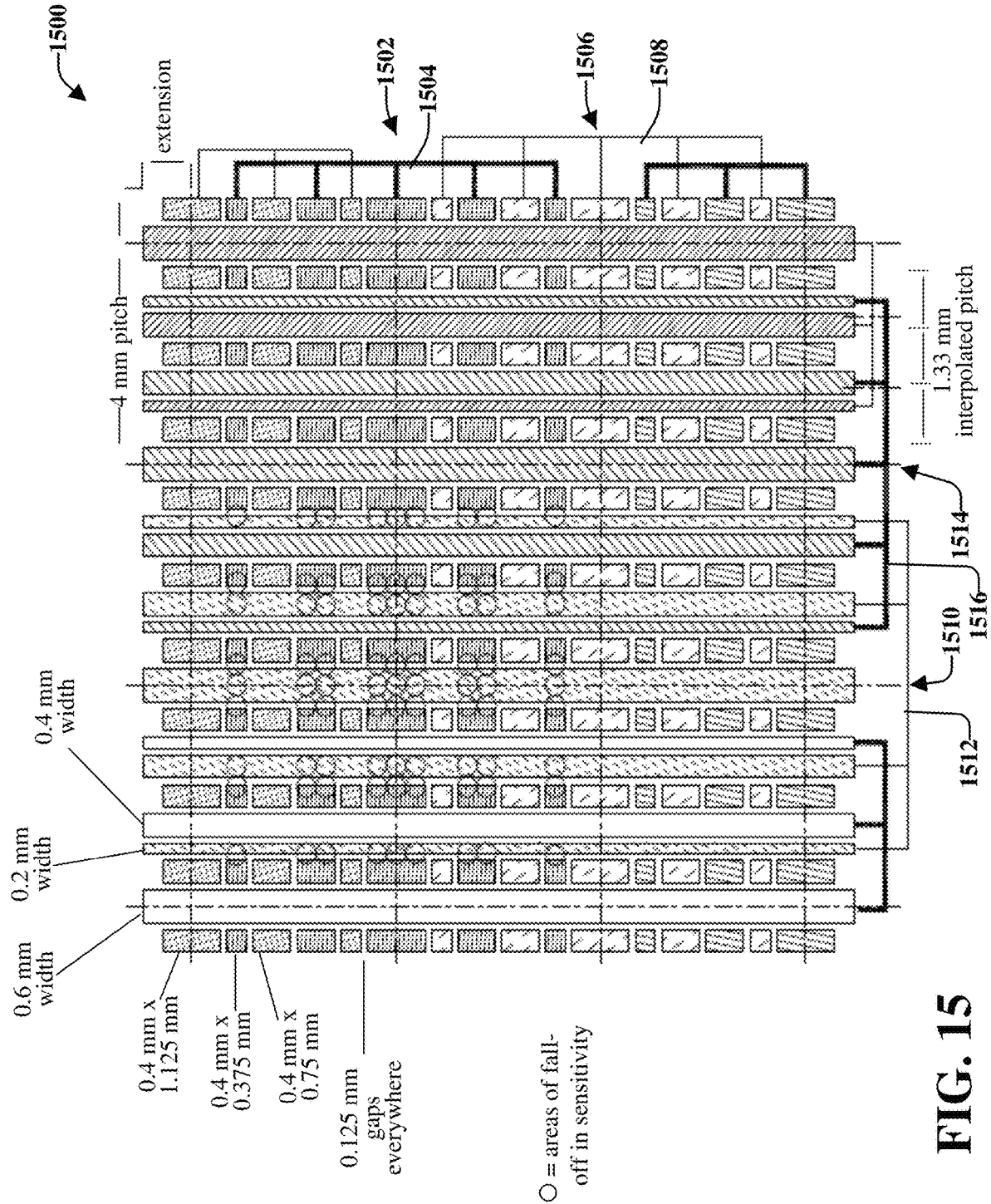
FIG. 15 illustrates an example, non-limiting, alternative embodiment of a capacitive-grid sensor that comprises a low-density interpolated electrode grid having the pattern 1-2-3-2-1 in accordance with one or more embodiments described herein.

FIG. 15 illustrates an example, non-limiting, alternative embodiment of a capacitive-grid sensor 1500 that comprises a low-density interpolated electrode grid having the pattern 1–2–3–2–1 in accordance with one or more embodiments described herein. FIG. 15 illustrates the LI version having an N value of 3 (n=3) on a printed circuit board.

As indicated in FIG. 15, the active row/column pitch is 4 mm, as indicated at the top right. Also, there is an extension beyond the edge in a first direction and a second direction. In some implementations, this extension can optionally be removed and/or the extension length can be adjustable. The 1.33 mm interpolated pitch is indicated at the bottom right. The columns have respective widths (e.g., the ratio is controlled by the widths of the sub-electrodes). For example, active column electrodes have a 0.6 mm width. Respective pairs of the interpolating column electrodes have one column electrode that has a 0.2 mm width and a second column electrode that has a 0.4 mm width. As indicated on the left, there are 0.125 mm gaps everywhere. It is noted that the sizes indicated are for example purposes only and, in various embodiments, different sizes can be utilized. Additionally, the pitch can be different with different values of m*n matrix.

In this case, there are five lines of each active row/column. For example, the set of five lines for the active row 1502 is indicated by the set of lines 1504. Further, the set of five lines for the active row 1506 is indicated by the set of lines 1508. Further, the set of five lines for the active column 1510 is indicated by the set of lines 1512. The set of five lines for the active column 1514 is indicated by the set of lines 1516.

The normalized width of lines are (1:2:3:2:1), as indicated by the circular markers, which represent areas of sensitivity fall-off. Thus, this embodiment creates a matrix of coupling single as illustrated. The matrix of FIG. 15 is:

$$\begin{bmatrix} 1 & 2 & 3 & 2 & 1 \\ 2 & 4 & 6 & 4 & 2 \\ 3 & 6 & 9 & 6 & 3 \\ 2 & 4 & 6 & 4 & 2 \\ 1 & 2 & 3 & 2 & 1 \end{bmatrix}$$

Figure 16:
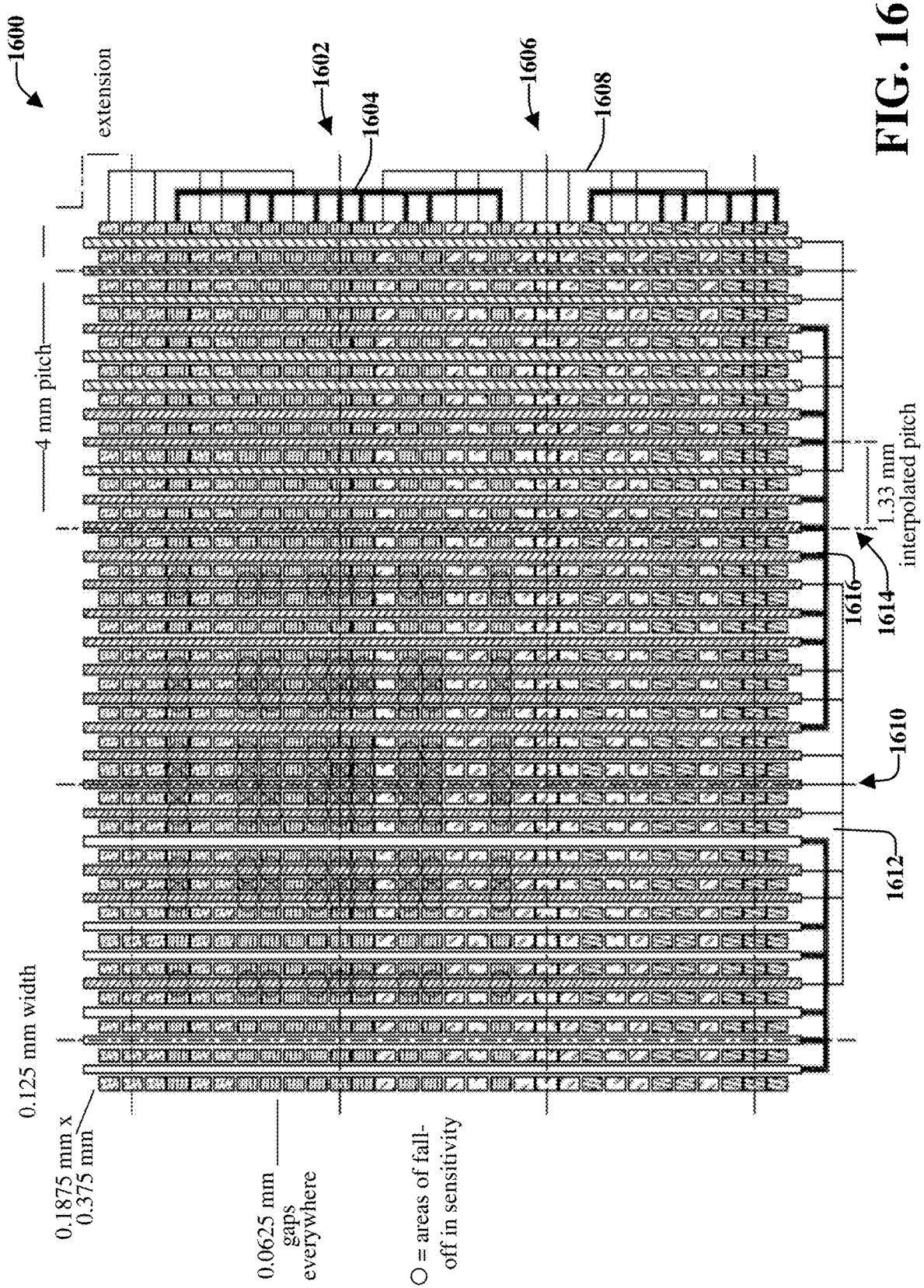
FIG. 16 illustrates an example, non-limiting, alternative embodiment of a capacitive-grid sensor that comprises a high-density interpolated electrode grid having the pattern 1-2-3-2-1 in accordance with one or more embodiments described herein.

FIG. 16 illustrates an example, non-limiting, alternative embodiment of a capacitive-grid sensor 1600 that comprises a high-density interpolated electrode grid having the pattern 1–2–3–2–1 in accordance with one or more embodiments described herein. FIG. 16 illustrates the HI version having an N value of 3 (n=3) on a printed circuit board. The pattern of FIG. 16, as well as other embodiments provided herein, is a periodic pattern.

As indicated in FIG. 16, the active row/column pitch is 4 mm, as indicated at the top right. Also, there is an extension beyond the edge in a first direction and a second direction. In some implementations, this extension can optionally be removed and/or the extension length can be adjustable. The 1.33 mm interpolated pitch is indicated at the bottom right. It is noted that the pitch can be different with different values of m*n matrix. As indicated on the left, for the example of FIG. 16, there are 0.0625 mm gaps everywhere. Respective widths of the columns are 0.125 mm respective widths of the rows are 0.1875 mm×0.375 mm in this example implementation.

In this case, there are nine lines of each active row/column. For example, the set of nine lines for the active row 1602 is indicated by the set of lines 1604. Further, the set of nine lines for the active row 1606 is indicated by the set of lines 1608. Further, the set of nine lines for the active column 1610 is indicated by the set of lines 1612. The set of nine lines for the active column 1614 is indicated by the set of lines 1616.

The normalized width of lines are (1:2:3:2:1), as indicated by the circular markers, which represent areas of sensitivity fall-off. Thus, this embodiment creates a matrix of coupling single as illustrated. The HI version of FIG. 16 is similar to the LI version of FIG. 15. However, in the LI version, the relative width is changed and in the HI version, the number of traces is changed.

The matrix of FIG. 16 is:

$$\begin{bmatrix} 1 & 2 & 3 & 2 & 1 \\ 2 & 4 & 6 & 4 & 2 \\ 3 & 6 & 9 & 6 & 3 \\ 2 & 4 & 6 & 4 & 2 \\ 1 & 2 & 3 & 2 & 1 \end{bmatrix}$$

Figure 17:
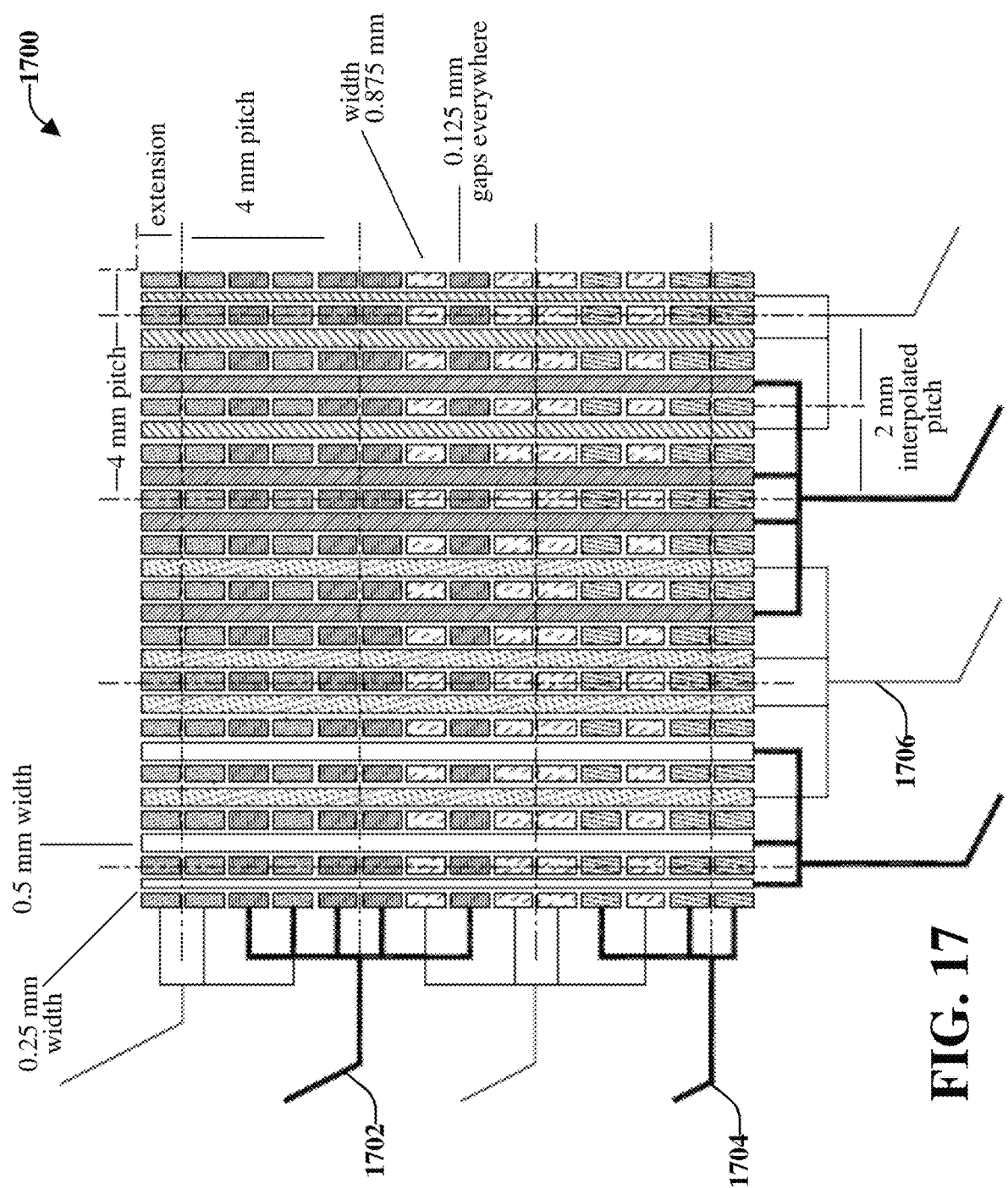
FIG. 17 illustrates an example, non-limiting, alternative embodiment of a printed sensor in accordance with one or more embodiments described herein.
Figure 18A:
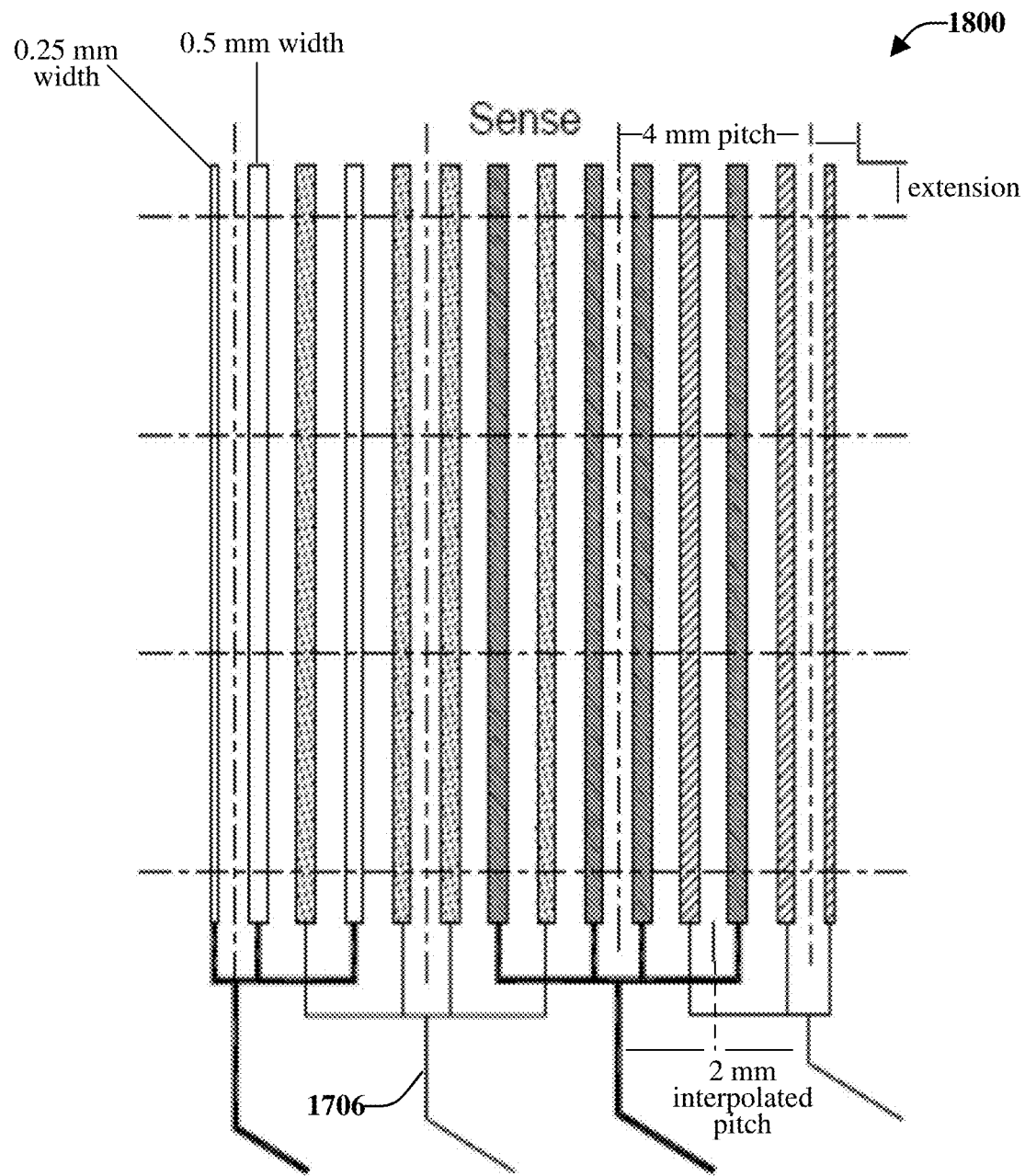
FIG. 18A illustrates a first layer that comprises the sense lines of the printed sensor of FIG. 17 in accordance with one or more embodiments described herein.
Figure 18B:
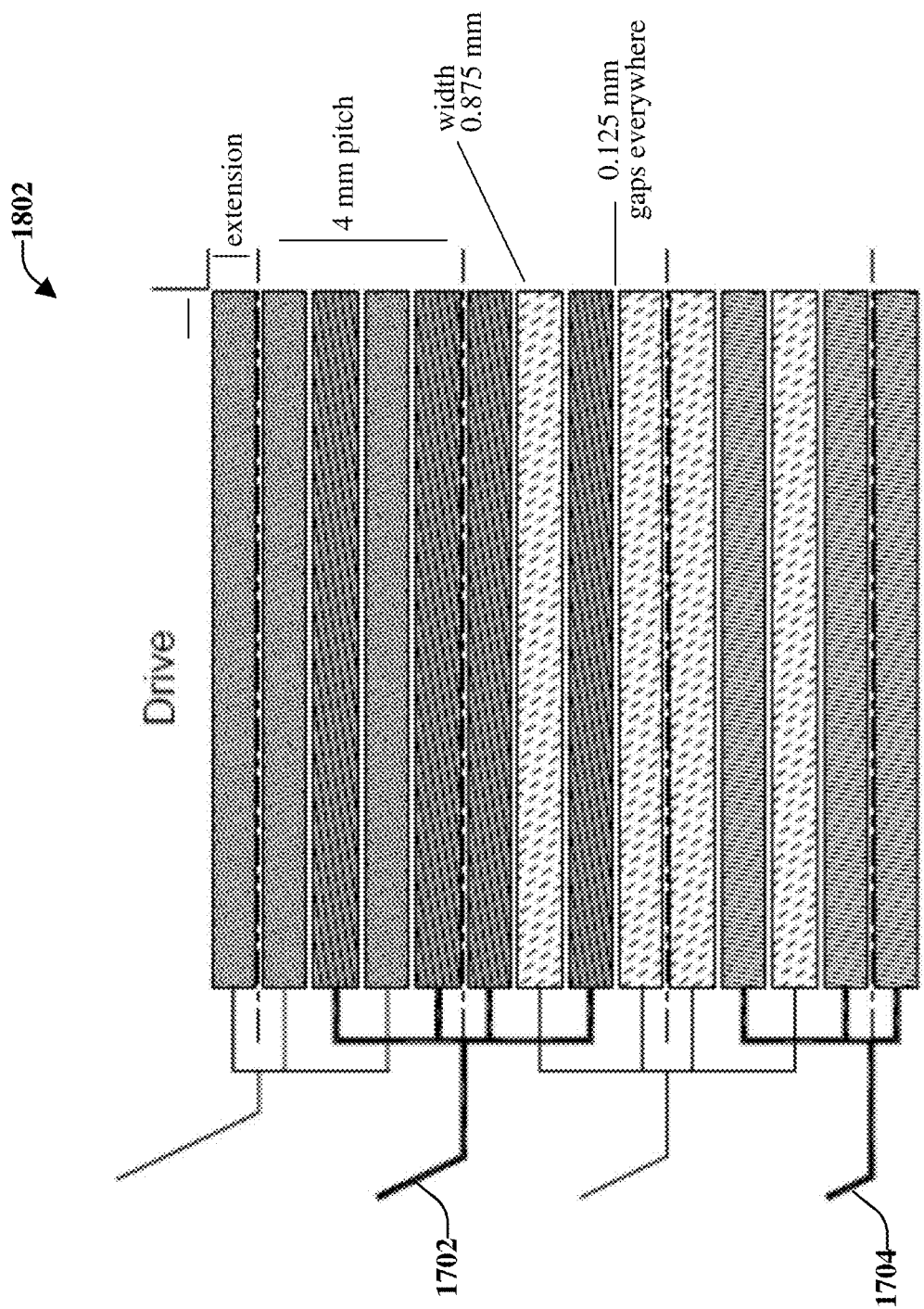
FIG. 18B illustrates a second layer that comprises the drive lines of the printed sensor of FIG. 17 in accordance with one or more embodiments described herein.

FIG. 17 illustrates an example, non-limiting, alternative embodiment of a printed sensor 1700 in accordance with one or more embodiments described herein. The embodiment of FIG. 17 is of printed interpolate capacitance sensors, where the 2–4–2 design is depicted. In this alternative embodiment, the sense lines and drive lines are separated into two layers. FIG. 18A illustrates a first layer 1800 that comprises the sense lines of the printed sensor 1700 of FIG. 17 in accordance with one or more embodiments described herein. Further, FIG. 18B illustrates a second layer 1802 that comprises the drive lines of the printed sensor 1700 of FIG. 17 in accordance with one or more embodiments described herein.

As indicated in FIG. 17, the active row/column pitch is 4 mm, as indicated at two portions on the top right. As illustrated, there is an extension beyond the edge in a first direction and a second direction. In some implementations, this extension can optionally be removed and/or the extension length can be adjustable. The example of FIG. 17 has a 2 mm interpolated pitch, as indicated at the bottom right. In various implementations, the pitch can be different with different values of m*n matrix. As indicated on the right, there are 0.125 mm gaps everywhere. For the example of FIG. 17, respective widths of the columns can be 0.25 mm (for the edges on the left and right) and 0.5 mm. Further, in the example of FIG. 17, respective widths of the rows can be 0.875 mm.

Grey lines, a few of which are labeled at 1702, 1704, and 1706 are printed silver interconnects. The other color lines (e.g., the sense lines and the drive lines) can be fabricated from silver, indium tin oxide (ITO), or any other conductive material that can be additively or subtractively patterned, transparent, opaque, or any intermediate transparency.

Figure 19A:
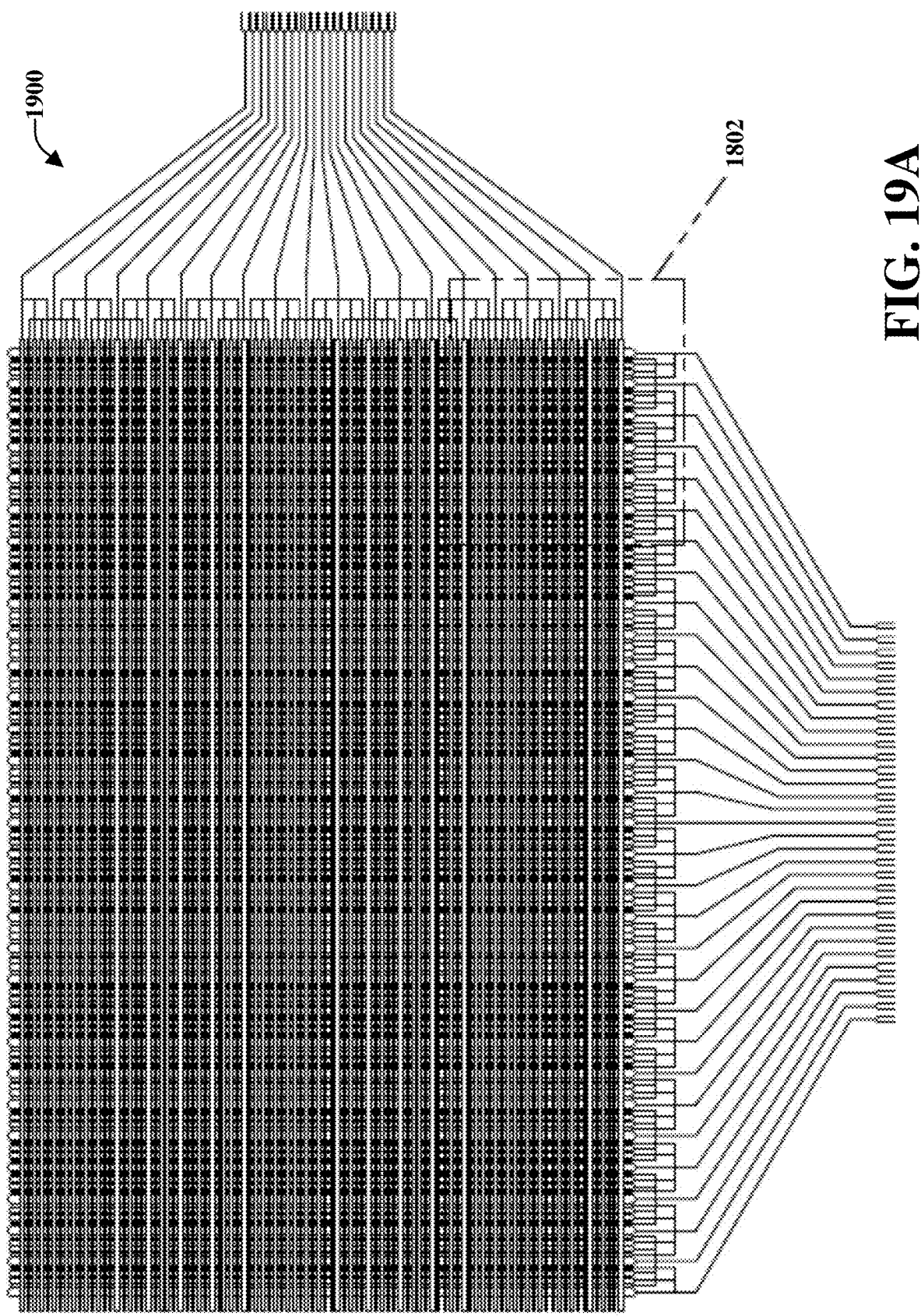
FIG. 19A illustrates another example, non-limiting, alternative embodiment of a printed interpolated capacitor in accordance with one or more embodiments described herein.
Figure 19B:
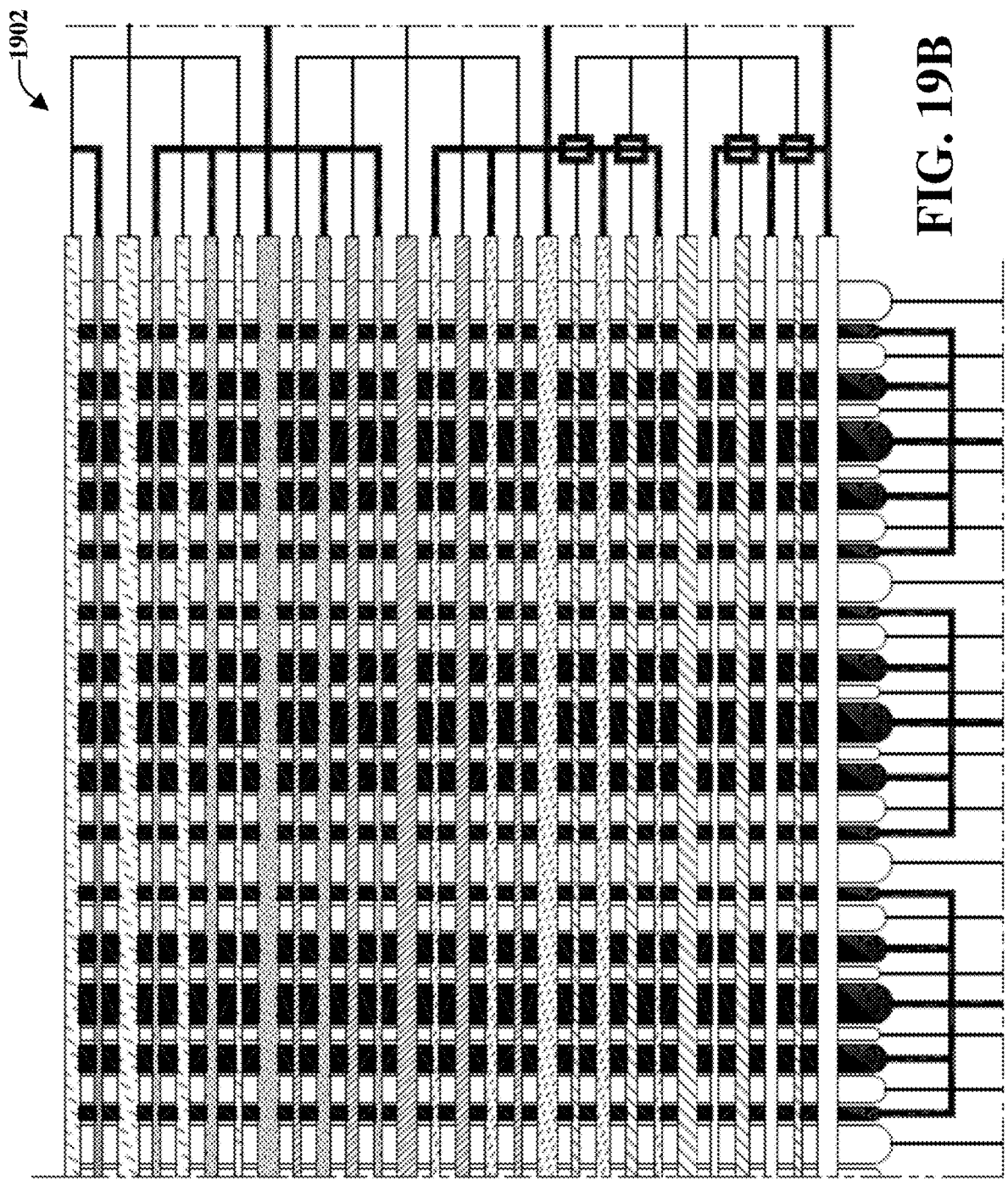
FIG. 19B illustrates an enlarged view of the noted portion of FIG. 19A in accordance with one or more embodiments described herein.

FIG. 19A illustrates another example, non-limiting, alternative embodiment of a printed interpolated capacitor 1900 in accordance with one or more embodiments described herein. This embodiment has an N value of 3 (n=3). FIG. 19B illustrates an enlarged view of the noted portion 1902 of FIG. 19A. FIGS. 19A and 19B illustrate the variable line widths of a printed design and any colors noted are for clarification purposes only. The printed interpolated capacitor 1900 can have the pattern (1–2–3–2–1). This is a hybrid of an LI version and an HI version because the trace width is varied (similar to an LI version) but there are gaps everywhere (similar to an HI version). In some implementations, this can be an LI structure or a HI structure.

Figure 20A:
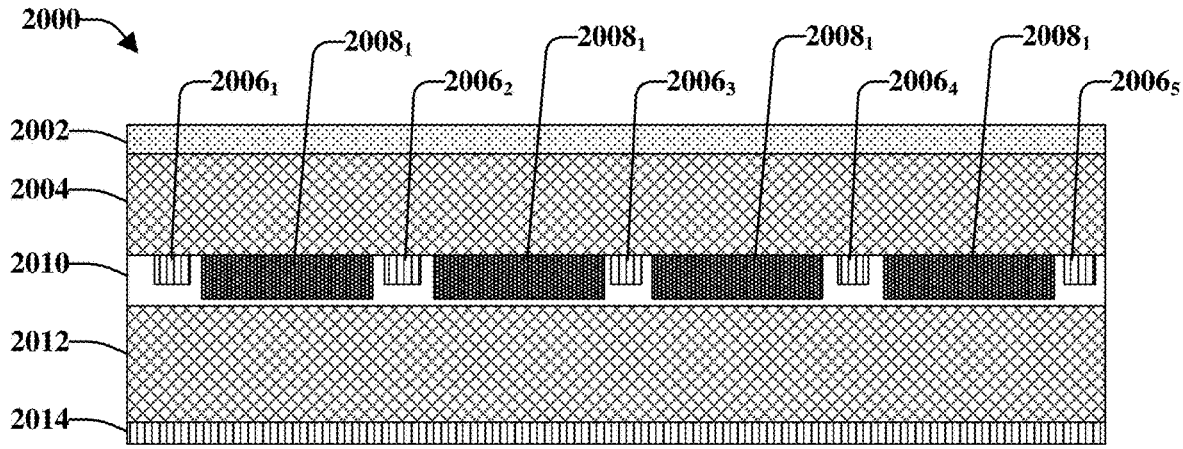
FIG. 20A illustrates an example, non-limiting, first embodiment of an integrated display in accordance with one or more embodiments described herein.

FIG. 20A illustrates an example, non-limiting, first embodiment of an integrated display 2000 in accordance with one or more embodiments described herein. As illustrated, the integrated display 2000 comprises a top surface 2002 and a first substrate 2004. A first side (e.g., bottom) of the top surface 2002 is operatively bonded, at a first side, to the top surface 2002. The first substrate 2004 is also operatively bonded, at a second side (which is opposite the first side) to respective first sides of one or more conductors and one or more display elements. Illustrated are five conductors $2006_1$, $2006_2$, $2006_3$, $2006_4$, and $2006_5$ and four display elements $2008_1$, $2008_2$, $2008_3$, and $2008_4$. The area that is not patterned or shaded is an adhesive area 2010. Further, a first side of a second substrate 2012 is operatively connected to the adhesive area 2010, on respective second sides of the one or more conductors and one or more display elements. The second side of the second substrate 2012 is operatively bonded to a conductor layer 2014.

Figure 20B:
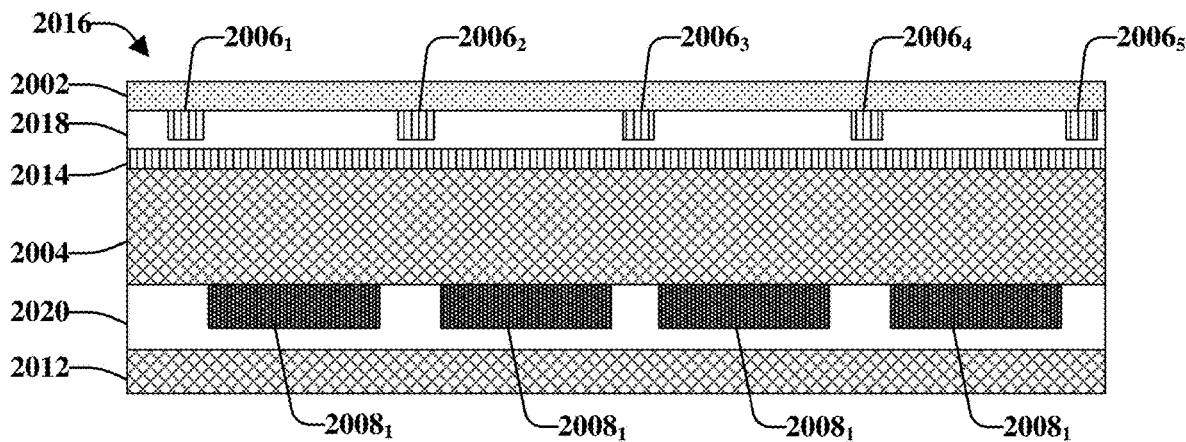
FIG. 20B illustrates an example, non-limiting, second embodiment of an integrated display in accordance with one or more embodiments described herein.

FIG. 20B illustrates an example, non-limiting, second embodiment of an integrated display 2016 in accordance with one or more embodiments described herein. Repetitive description of like elements employed in other embodiments described herein is omitted for sake of brevity. In this embodiment, the first side of the top surface 2002 is operatively bonded to respective first sides of one or more conductors. The area not patterned or shaded is a first adhesive area 2018 according to the second embodiment. In this embodiment, a first side of the conductor layer 2014 is operatively bonded to the first adhesive area 2018, at respective second sides of the one or more conductors. A second side of the conductor layer 2014 is operatively coupled to a first side of the first substrate 2004. A second side of the first substrate 2004 is operatively bonded to respective first sides of the one or more display elements. A second adhesive area 2020 operatively bonds the second side of the first substrate 2004 and the respective second sides of the one or more display elements to the second substrate 2012.

Figure 20C:
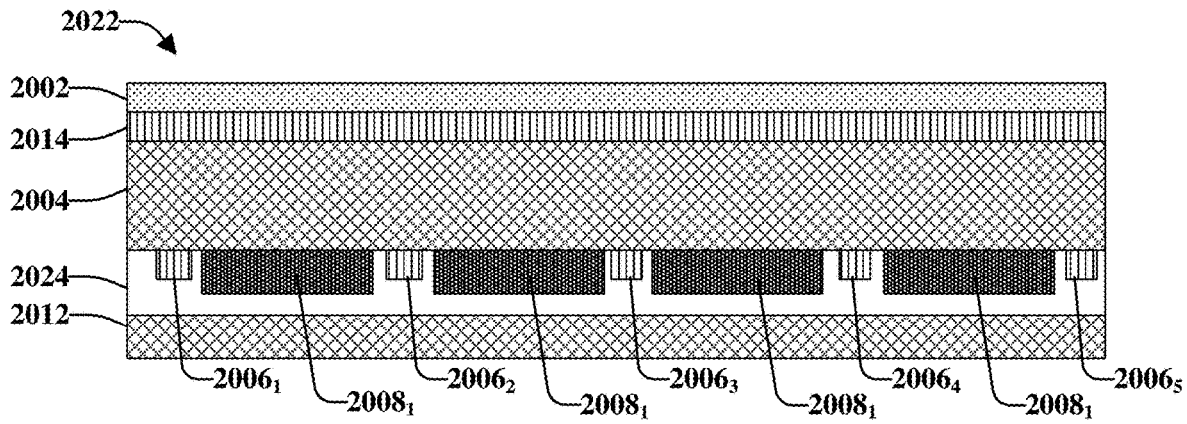
FIG. 20C illustrates an example, non-limiting, third embodiment of an integrated display in accordance with one or more embodiments described herein.

FIG. 20C illustrates an example, non-limiting, third embodiment of an integrated display 2022 in accordance with one or more embodiments described herein. Repetitive description of like elements employed in other embodiments described herein is omitted for sake of brevity. In this embodiment, the first side of the top surface 2002 is operatively bonded to a first side of the conductor layer 2014. A second side of the conductor layer 2014 is operatively coupled to a first side of the first substrate 2004. A second side of the first substrate is operatively bonded to respective first sides of one or more conductors and the one or more display elements. An adhesive layer 2024 (the area not patterned nor shaded) operatively bonds the second side of the first substrate 2004 and the respective first sides of one or more conductors and the one or more display elements to a first side of the second substrate 2012.

As depicted by the various embodiments of FIGS. 20A, 20B, and 20C, a transparent sensor that can sit on top of a display using the capacitive-grid sensor discussed herein can be realized. For example, the capacitive-grid sensor can work together with in-cell and/or on-cell capacitive sensor displays. The embodiments of FIGS. 20A, 20B, and 20C can integrated display elements with various touch sensors. It is noted that the disclosed embodiments operate seamlessly for display applications because on-display have very thin traces and can map the traces to the traces, such as an HI version, as discussed herein.

Figure 21A:
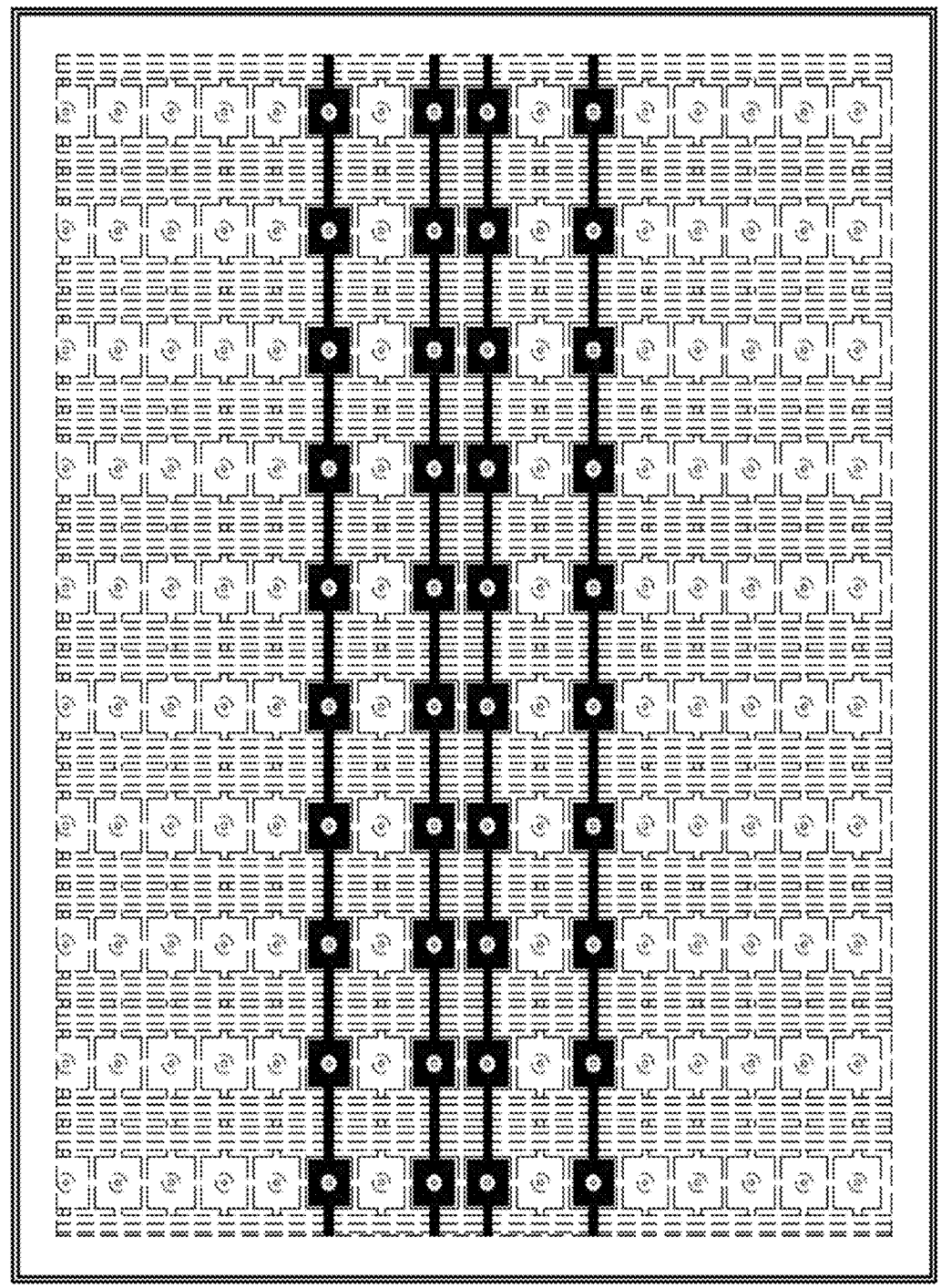
FIG. 21A illustrates an example, non-limiting, alternative embodiment that integrates force based sensing with the addition of a force sensitive resistor in accordance with one or more embodiments described herein.
Figure 21B:
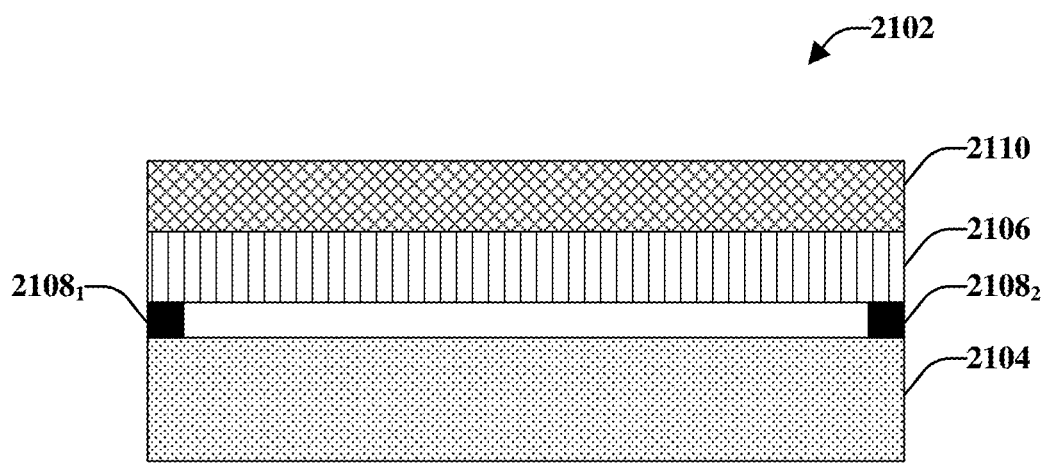
FIG. 21B illustrates an example, non-limiting, architecture for the embodiment of FIG. 21A in accordance with one or more embodiments described herein.

FIG. 21A illustrates an example, non-limiting, alternative embodiment 2100 that integrates force based sensing with the addition of a force sensitive resistor (FSR) in accordance with one or more embodiments described herein. FIG. 21B illustrates an example, non-limiting, architecture 2102 for the embodiment 2100 of FIG. 21A.

In this embodiment, there can be exposed electrodes and an FSR layer. It is noted that although discussed with respect to an FSR, the disclosed embodiments can be applied with other types of sensing. As illustrated in FIG. 21B, a Printed Circuit Board Assembly (PCBA) 2104 can be operative bonded to an FSR on PET substrate 2106 via one or more perimeter "ring" adhesives. For example, the bonding between the PCBA 2104 and the FSR on PET substrate 2106 can be facilitated via a first perimeter ring adhesive $2108_1$ and a second perimeter ring adhesive $2108_2$. For example, respective areas of a first side of the PCBA 2104 can be bonded to respective first sides of the perimeter ring adhesives. Further, respective second sides of the perimeter ring adhesives can be operatively bonded to respective areas of a first side of the FSR on PET substrate 2106. In an optional embodiment, a second side of the FSR on PET substrate 2106 can be operatively attached to a touch surface 2110.

As discussed herein, the one or more embodiments relate to patterning a capacitive sensor comprising multiple drive lines and multiple sense lines that are interpolated. For example, the sensors provided herein is a purely capacitive interpolation architecture, which replaces interpolation impedance elements (e.g., resistors). Such capacitive-grid sensor patternings can include a low-density interpolated pattern or a high-density interpolated pattern.

Methods that can be implemented in accordance with the disclosed subject matter, will be better appreciated with reference to the flow charts provided herein. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 22:
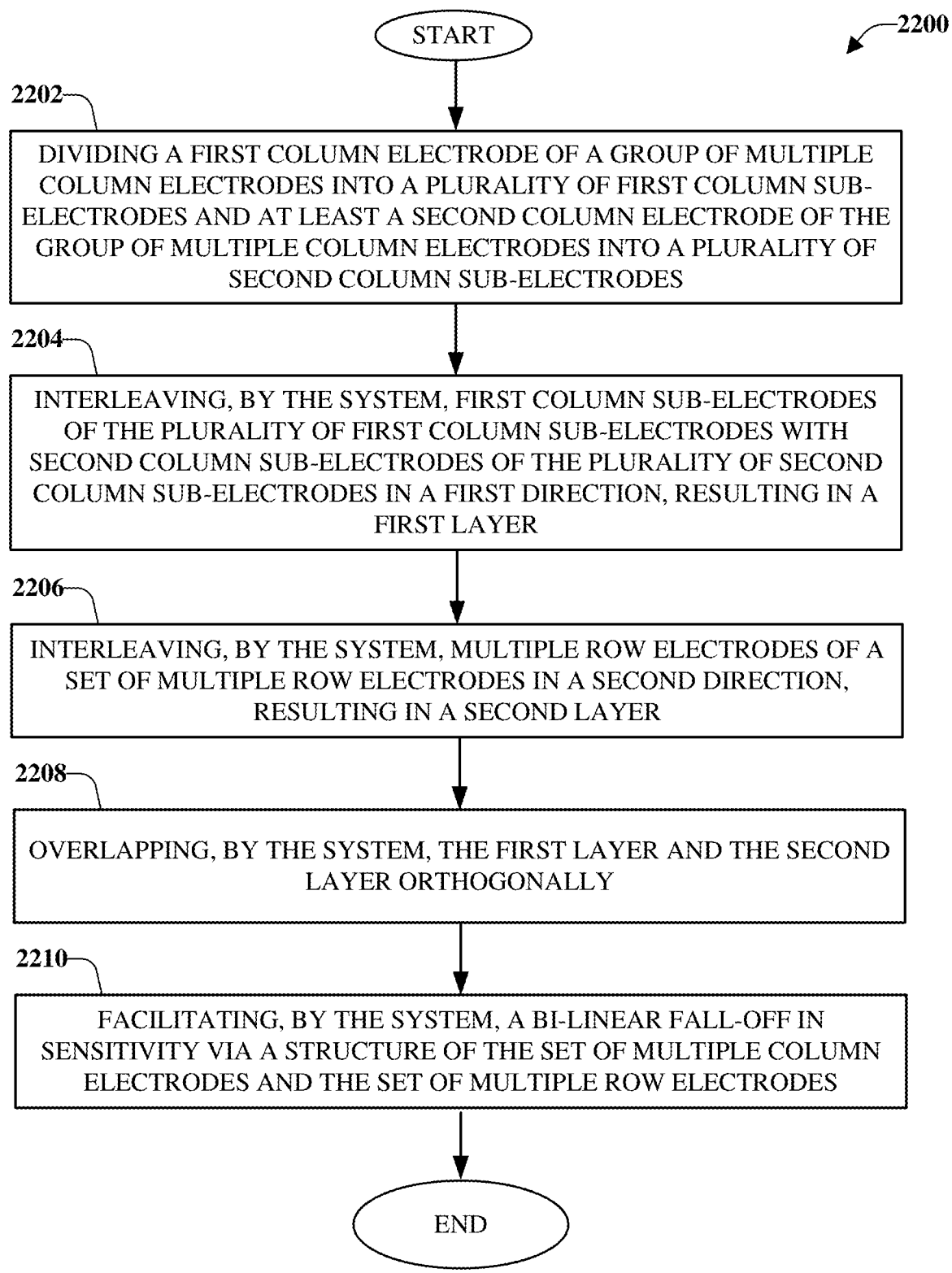
FIG. 22 illustrates a flow diagram of an example, non-limiting, method that facilitates interpolation electrode patterning for capacitive-grid touch sensors in accordance with one or more embodiments described herein.

FIG. 22 illustrates a flow diagram of an example, non-limiting, method 2200 that facilitates interpolation electrode patterning for capacitive-grid touch sensors in accordance with one or more embodiments described herein. The method 2200 and/or other methods discussed herein can be implemented by a system comprising a processor and a memory.

The method 2200 starts at 2202 when a system comprising a processor divides a first column electrode of a group of multiple column electrodes into a plurality of first column sub-electrodes. Further, at 2202, at least a second column electrode of the group of multiple column electrodes is divided into a plurality of second column sub-electrodes.

First column sub-electrodes of the plurality of first column sub-electrodes are interleaved, at 2204, with second column sub-electrodes of the plurality of second column sub-electrodes in a first direction, resulting in a first layer. The first column electrodes and the second column electrodes are adjacent column electrodes.

Further, at 2206, multiple row electrodes of a group of multiple row electrodes are interleaved in a second direction, resulting in a second layer. According to some implementations, prior to interleaving the multiple row electrodes in the second direction, the method can include dividing, by the system, a first row electrode of a group of multiple row electrodes into a plurality of first row sub-electrodes and at least a second row electrode of the group of multiple row electrodes into a plurality of second row sub-electrodes. Further, to these implementations, the method can include interleaving, by the system, first row sub-electrodes of the plurality of first row sub-electrodes with second row sub-electrodes of the plurality of second row sub-electrodes in the second direction. The first row electrode and the second row electrode are adjacent row electrodes.

The first layer and second layer are overlapped orthogonally, at 2208. At 2210, a bi-linear fall-off in sensitivity is facilitated via a structure of the set of multiple column electrodes and the set of multiple row electrodes. According to some implementations, the method can include controlling the sensitivity based on controlling respective column widths of the first column sub-electrodes and the second column sub-electrodes, and respective row sub-electrodes of the multiple row electrodes.

In some implementations, the method can include controlling the sensitivity based on controlling a density of the first column sub-electrodes, the second column sub-electrodes, and respective row sub-electrodes of the multiple row electrodes. Further to these implementations, the method can include arranging, by the system, the plurality of first column sub-electrodes and the plurality of second column sub-electrodes into bundles. The arranging can include setting respective spacing within the bundles as a zero gap or a substantially zero gap. Alternatively or additionally, in some implementations, the method can include setting, by the system, respective spacing between bundled sub-electrodes and non-bundled sub-electrodes as a substantially even spacing.

As discussed, provided herein is a device that includes multiple column electrodes that include a first column electrode divided into a plurality of first column sub-electrodes and at least a second column electrode divided into a plurality of second column sub-electrodes. The first column electrode and the second column electrode are adjacent column electrodes. Further, first column sub-electrodes of the plurality of first column sub-electrodes are interleaved with second column sub-electrodes of the plurality of second column sub-electrodes in a first direction. A first layer of the device comprises the multiple column electrodes.

The device also includes multiple row electrodes interleaved in a second direction. A second layer of the device comprises the multiple row electrodes. The first layer and the second layer overlap and the first layer is orthogonal (e.g., or off axis to a degree) to the second layer (e.g., the first direction is orthogonal to the second direction). A bi-linear fall-off in sensitivity is facilitated through a structure of the multiple column electrodes and the multiple row electrodes.

For example, the structure facilitates sensitivity control based on respective column widths of the first column sub-electrodes and the second column sub-electrodes, and respective row sub-electrodes of the multiple row electrodes. In another example, the structure facilitates sensitivity control based on a density of the first column sub-electrodes, the second column sub-electrodes, and respective row sub-electrodes of the multiple row electrodes. Further to this example, the plurality of first column sub-electrodes and the plurality of second column sub-electrodes are organized into bundles and respective spacing within the bundles comprises a zero gap or a substantially zero gap.

In some implementations, respective widths of the plurality of first column sub-electrodes and the plurality of second column sub-electrodes comprise a first width for a pair of active electrode columns and a second width for interpolating electrode columns, the second width is half of the first width. According to some implementations, respective active rows of a group of active rows comprise lines of pads connected on Layer 2 with microvias. Further to these implementations, respective active columns of a group of active columns are orthogonal to respective active rows and comprise lines of traces connected on Layer 2 with microvias.

The multiple row electrodes include a first row electrode divided into a plurality of first row sub-electrodes and at least a second row electrode divided into a plurality of second row sub-electrodes. The first row electrode and the second row electrode are adjacent row electrodes. First row sub-electrodes of the plurality of first row sub-electrodes are interleaved with second row sub-electrodes of the plurality of second row sub-electrodes in the second direction.

A spacing of the device can be a substantially even spacing between bundled sub-electrodes and non-bundled sub-electrodes. Further to this implementations, respective active rows of a group of active rows comprise lines of pads connected on Layer 2 with microvias, wherein respective active columns of a group of active columns are orthogonal to respective active rows and comprise lines of traces connected on Layer 2 with microvias.

The device can include a pattern of 1–2–1 according to an implementation. In another implementation, the device can include a pattern of 1–2–3–2–1.

The device can be integrated in a display element. Alternatively, the device can be operatively bonded to a force sensitive resistor sheet. In some implementations, the device can be a capacitive force device. Further, the device can be a touch sensor. According to some implementations, the device is configured to receive input from one or more of a finger, a pointing object, a selector device, an active stylus, and a passive stylus.

The multiple electrodes can include, according to some implementations, multiple sense lines and multiple drive lines. The multiple sense lines are integrated on a first layer of the device. The multiple drive lines are integrated on a second layer of the device.

Within a layer of the device (regardless of whether the layer is a drive layer or a sense layer) there are interleaved and/or interdigitated sub-electrodes of multiple electrodes, which create the linear fall-off. The bi-linearity occurs when the sense layer and drive layer are overlapped orthogonally to complete the sensor in the first direction and the second direction. Thus, the two orthogonal layers create the bi-linearity.

In this description, for purposes of explanation, numerous specific details are set forth in order to provide a thorough understanding of the various embodiments. However, the various embodiments can be practiced without these specific details.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," "in an embodiment," "an implementation" in various places throughout this specification are not necessarily all referring to the same embodiment. Furthermore, the particular features, structures, or characteristics can be combined in any suitable manner in one or more embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A device, comprising:
    multiple column electrodes comprising a first column electrode divided into a plurality of first column sub-electrodes and at least a second column electrode divided into a plurality of second column sub-electrodes, wherein the first column electrode and the second column electrode are adjacent column electrodes, wherein first column sub-electrodes of the plurality of first column sub-electrodes are interleaved with second column sub-electrodes of the plurality of second column sub-electrodes in a first direction, and wherein a first layer of the device comprises the multiple column electrodes; and
    multiple row electrodes interleaved in a second direction, wherein a second layer of the device comprises the multiple row electrodes, wherein the first layer and the second layer overlap and wherein a bi-linear fall-off in sensitivity is facilitated through a structure of the multiple column electrodes and the multiple row electrodes; wherein,
    the structure facilitates sensitivity control based on a density of the first column sub-electrodes, the second column sub-electrodes, and respective row sub-electrodes of the multiple row electrodes, the plurality of first column sub-electrodes and the plurality of second column sub-electrodes are organized into bundles and respective spacing within the bundles comprises a zero gap or a substantially zero gap, and respective widths of the plurality of first column sub-electrodes and the plurality of second column sub-electrodes comprise a first width for a pair of active electrode columns and a second width for interpolating electrode columns, the second width is half of the first width.

2. The device of claim 1, wherein the multiple row electrodes comprise a first row electrode divided into a plurality of first row sub-electrodes and at least a second row electrode divided into a plurality of second row sub-electrodes, wherein the first row electrode and the second row electrode are adjacent row electrodes, wherein first row sub-electrodes of the plurality of first row sub-electrodes are interleaved with second row sub-electrodes of the plurality of second row sub-electrodes in the second direction.

3. The device of claim 1, wherein the structure facilitates sensitivity control based on respective column widths of the first column sub-electrodes and the second column sub-electrodes, and respective row sub-electrodes of the multiple row electrodes.

4. The device of claim 1, wherein the sub-electrodes comprise lines of pads connected on the second layer of the device with microvias, wherein respective columns are orthogonal to respective rows and comprise lines of traces connected on the second layer of the device with microvias.

5. The device of claim 1, wherein a spacing is a substantially even spacing between bundled sub-electrodes and non-bundled sub-electrodes.

6. The device of claim 4, wherein the sub-electrodes comprise lines of pads connected on the second layer of the device with microvias, wherein respective columns are orthogonal to respective rows and comprise lines of traces connected on the second layer of the device with microvias.

7. The device of claim 1, wherein the first direction is orthogonal to the second direction.

8. The device of claim 1, wherein the device comprises a pattern of 1-2-1 sub-electrodes.

9. The device of claim 1, wherein the device comprises a pattern of 1-2-3-2-1 sub-electrodes.

10. The device of claim 1, wherein the device is integrated in a display element.

11. The device of claim 1, wherein the device is operatively bonded to a force sensitive resistor sheet.

12. The device of claim 1, wherein the device is a capacitive force device.

13. The device of claim 1, wherein the multiple column electrodes comprise multiple sense lines, wherein the multiple row electrodes comprise multiple drive lines, wherein the multiple sense lines are integrated on the first layer of the device, and wherein the multiple drive lines are integrated on the second layer of the device.

14. The device of claim 1, wherein the device is a touch sensor.

15. The device of claim 1, wherein the device is configured to receive input from one or more of a finger, a pointing object, a selector device, an active stylus, and a passive stylus.

16. A method comprising: dividing, by a system comprising a processor, a first column electrode of a set of multiple column electrodes into a plurality of first column sub-electrodes and at least a second column electrode of the set of multiple column electrodes into a plurality of second column sub-electrodes; interleaving, by the system, first column sub-electrodes of the plurality of first column sub-electrodes with second column sub-electrodes of the plurality of second column sub-electrodes in a first direction, resulting in a first layer; interleaving, by the system, multiple row electrodes of a set of multiple row electrodes in a second direction, resulting in a second layer; overlapping, by the system, the first layer and the second layer orthogonally; facilitating, by the system, a bi-linear fall-off in sensitivity via a structure of the set of multiple column electrodes and the set of multiple row electrodes; dividing, by the system, a first row electrode of a group of multiple row electrodes into a plurality of first row sub-electrodes and at least a second row electrode of the group of multiple row electrodes into a plurality of second row sub-electrodes; and interleaving, by the system, first row sub-electrodes of the plurality of first row sub-electrodes with second row sub-electrodes of the plurality of second row sub-electrodes in the second direction.

17. The method of claim 16, wherein the first column electrode and the second column electrode are adjacent column electrodes, and wherein the first row electrode and the second row electrode are adjacent row electrodes.

18. The method of claim 16, further comprising:
controlling, by the system, the sensitivity based on controlling respective column widths of the first column sub-electrodes and the second column sub-electrodes, and respective row sub-electrodes of the multiple row electrodes.

19. The method of claim 16, further comprising:
controlling, by the system, the sensitivity based on controlling a density of the first column sub-electrodes, the second column sub-electrodes, and respective row sub-electrodes of the multiple row electrodes.

20. The method of claim 19, further comprising:
arranging, by the system, the plurality of first column sub-electrodes and the plurality of second column sub-electrodes into bundles, wherein the arranging comprises setting respective spacing within the bundles as a zero gap or a substantially zero gap.

21. The method of claim 19, further comprising:
setting, by the system, respective spacing between bundled sub-electrodes and non-bundled sub-electrodes as a substantially even spacing.

22. A system, comprising: a processor; and a memory that stores executable instructions that, when executed by the processor, facilitate performance of operations, wherein the operations comprise: dividing a first column electrode of a group of multiple column electrodes into a plurality of first column sub-electrodes and at least a second column electrode of the group of multiple column electrodes into a plurality of second column sub-electrodes; interleaving first column sub-electrodes of the plurality of first column sub-electrodes with second column sub-electrodes of the plurality of second column sub-electrodes in a first direction, resulting in a first layer; interleaving multiple row electrodes of a group of multiple row electrodes in a second direction, resulting in a second layer; overlapping the first layer and the second layer orthogonally; facilitating a bi-linear fall-off in sensitivity via a structure of the group of multiple column electrodes and the group of multiple row electrodes; dividing a first row electrode of the group of multiple row electrodes into a plurality of first row sub-electrodes and at least a second row electrode of the group of multiple row electrodes into a plurality of second row sub-electrodes; and interleaving first row sub-electrodes of the plurality of first row sub-electrodes with second row sub-electrodes of the plurality of second row sub-electrodes in the second direction.

23. The system of claim 22, wherein the operations further comprise:
controlling the sensitivity based on controlling respective column widths of the first column sub-electrodes and the second column sub-electrodes, and respective row sub-electrodes of the group of multiple row electrodes.

24. The system of claim 22, wherein the operations further comprise:
controlling the sensitivity based on controlling a density of the first column sub-electrodes, the second column sub-electrodes, and respective row sub-electrodes of the group of multiple row electrodes.

25. The system of claim 22, wherein the operations further comprise:
arranging the plurality of first column sub-electrodes and the plurality of second column sub-electrodes into bundles, wherein the arranging comprises setting respective spacing within the bundles as a zero gap or a substantially zero gap.

26. The system of claim 22, wherein the operations further comprise:
setting respective spacing between bundled sub-electrodes and non-bundled sub-electrodes as a substantially even spacing.

* * * * *